United States Patent
Shen et al.

(10) Patent No.: US 10,886,417 B2
(45) Date of Patent: Jan. 5, 2021

(54) DEVICE, SYSTEM, AND METHOD TO CHANGE A CONSISTENCY OF BEHAVIOR BY A CELL CIRCUIT

(71) Applicant: Intel Corporation, Santa Clara, CA (US)

(72) Inventors: Kuan-Yueh Shen, Portland, OR (US); Rachael Parker, Forest Grove, OR (US); Stephen Ramey, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/369,856

(22) Filed: Mar. 29, 2019

(65) Prior Publication Data
US 2020/0313003 A1 Oct. 1, 2020

(51) Int. Cl.
| | |
|---|---|
| *H01L 29/788* | (2006.01) |
| *H04L 9/32* | (2006.01) |
| *G06F 7/58* | (2006.01) |
| *H03B 5/12* | (2006.01) |
| *H01L 29/423* | (2006.01) |

(52) U.S. Cl.
CPC .......... *H01L 29/7885* (2013.01); *G06F 7/588* (2013.01); *H01L 29/4232* (2013.01); *H03B 5/1228* (2013.01); *H04L 9/3278* (2013.01)

(58) Field of Classification Search
None
See application file for complete search history.

(56) References Cited

U.S. PATENT DOCUMENTS

| | | | | |
|---|---|---|---|---|
| 5,844,298 | A | * 12/1998 | Smith | G11C 17/18 |
| | | | | 257/530 |
| 2003/0223166 | A1 | * 12/2003 | Chen | H01L 27/0266 |
| | | | | 361/56 |

(Continued)

OTHER PUBLICATIONS

Mathew, Sanu K. et al., "A 0.19pJ/b PVT-Variation-Tolerant Hybrid Physically Unclonable Function Circuit for 100% Stable Secure Key Generation in 22nm CMOS", ISCC 2014, Session 16, SoC Building Blocks, 16.2, 3 pgs.*

(Continued)

*Primary Examiner* — Muna A Techane
(74) *Attorney, Agent, or Firm* — Green, Howard & Mughal LLP

(57) ABSTRACT

Techniques and mechanisms for changing a consistency with which a cell circuit ("cell") settles into a given state. In one embodiment, a cell settles into a preferred state based on a relative polarity between respective voltages of a first rail and a second rail. Based on the preferred state, a hot carrier injection (HCI) stress is applied to change a likelihood of the cell settling into the preferred state. Applying the HCI stress includes driving off-currents of two PMOS transistors of the cell while the relative polarity is reversed. In another embodiment, a cell array comprises multiple cells which are each classified as being a respective one of a physically unclonable function (PUF) type or a random number generator (RNG) type. A cell is selected for biasing, and a stress is applied, based on each of: that cell's preferred state, that cell's classification, and another cell's classification.

20 Claims, 15 Drawing Sheets

(56) References Cited

U.S. PATENT DOCUMENTS

| | | | | |
|---|---|---|---|---|
| 2012/0163103 | A1* | 6/2012 | Hafez | G11C 17/16 |
| | | | | 365/189.16 |
| 2017/0200508 | A1* | 7/2017 | Grigoriev | G09C 1/00 |
| 2017/0242660 | A1* | 8/2017 | Katoh | H04L 9/003 |
| 2019/0244933 | A1* | 8/2019 | Or-Bach | G11C 11/5628 |
| 2020/0145008 | A1* | 5/2020 | Strukov | H03K 19/17756 |

OTHER PUBLICATIONS

Nikoozadeh, Amin et al., "An Analysis of Latch Comparator Offset Due to Load Capacitor Mismatch", IEEE Transactions on Circuits and Systems, vol. 53, No. 12, Dec. 2006, 5 pgs.*

Restriction Requirement dated Apr. 17, 2020 for U.S. Appl. No. 16/417,538.

Mathew, Sanu K. et al., "A 0.19pJ/b PVT-Variation-Tolerant Hybrid Physically Unclonable Function Circuit for 100% Stable Secure Key Generation in 22nm CMOS", ISCC 2014, Session 16, SoC Building Blocks, 16.2, 3 pgs.

Nikoozadeh, Amin et al., "An Analysis of Latch Comparator Offset Due to Load Capacitor Mismatch", IEEE Transactions on Circuits and Systems, vol. 53, No. 12, Dec. 2006, 5 pgs.

Non-Final Office Action dated May 15, 2020 for U.S. Appl. No. 16/417,538.

Notice of Allowance dated Jul. 23, 2020 for U.S. Appl. No. 16/417,538.

* cited by examiner

200

210

Receiving a signal indicating a preferred state of a cell circuit, wherein, during the preferred state, the cell circuit provides first complementary signals each at a different respective one of a first node and a second node

212

Based on the signal, determining a correspondence of second complementary signals each to a different respective one of the first node or the second node

214

Reversing a relative polarity of a first voltage at a first voltage rail with respect to a second voltage at a second voltage rail

216

After reversing the relative polarity, providing the second complementary signals to the first node and the second node according to the correspondence

FIG. 2

Biasing toward PUF cell behavior 350

| Input | Reset | Evaluation | Write back |
|---|---|---|---|
| V0 | $V_{lo}$ | $V_{lo}$ | $V_{hi}$ |
| V1 | $V_{hi}$ | $V_{hi}$ | $V_{lo}$ |
| RST | 1 | 0 | 0 |
| Bit/Bitb | ~$V_{trip}$ | 0/1 (cell type 1)<br>1/0 (cell type 2) | 1/0 (cell type 1)<br>0/1 (cell type 2) |
| Xb/X | NA | NA | 1/0 (cell type 1)<br>0/1 (cell type 2) |
| IE (OE#) | 0 | 0 | 1 |

Biasing toward RNG cell behavior 360

| Input | Reset | Evaluation | Write back |
|---|---|---|---|
| V0 | $V_{lo}$ | $V_{lo}$ | $V_{hi}$ |
| V1 | $V_{hi}$ | $V_{hi}$ | $V_{lo}$ |
| RST | 1 | 0 | 0 |
| Bit/Bitb | ~$V_{trip}$ | 0/1 (cell type 1)<br>1/0 (cell type 2) | 0/1 (cell type 1)<br>1/0 (cell type 2) |
| Xb/X | NA | NA | 0/1 (cell type 1)<br>1/0 (cell type 2) |
| IE (OE#) | 0 | 0 | 1 |

710

Identifying a first cell circuit of a cell array as being of a first cell type which is one of a PUF cell type or an RNG cell type

712

Identifying a second cell circuit of the cell array as being of a second cell type which is one of the PUF cell type or the RNG cell type

714

Determining a preferred state of the first cell circuit, wherein, during the preferred state, two nodes of the first cell circuit each provide a different respective one of first complementary signals

716

Identifying a stress scheme based on each of the preferred state, the first cell type and the second cell type

718

Stressing the first cell circuit according to the scheme, including providing second complementary signals each at a different respective node of the two nodes

FIG. 7

DEVICE, SYSTEM, AND METHOD TO CHANGE A CONSISTENCY OF BEHAVIOR BY A CELL CIRCUIT

BACKGROUND

1. Technical Field

This disclosure generally relates to integrated circuitry and more particularly, but not exclusively, to operations to change a stability of a cell circuit.

2. Background Art

The contamination of electronic component supply chains by counterfeit hardware devices is a serious and growing risk in today's globalized marketplace. Re-marking, cloning and other counterfeiting techniques (which can occur at different levels) affect manufacturers' profit margins and risk damaging and/or otherwise incorrect operation of consumers' devices.

Many electronic circuits, such as computer chips, use encryption keys to provide device authentication to protect against counterfeiting. The encryption key is sometimes programmed by the manufacturer and stored in fuses on the electronic circuit die. However, the fuses are prone to visual and electrical probing attacks. Furthermore, since the fuses are programmed by the manufacturer, they are vulnerable to an insider attack on the test floor.

To avoid these risks, some security applications use a physically unclonable function (PUF) circuit which, typically, exploits physical variation in devices (e.g., transistors) to generate a stable and repeatable encryption key. As the internet of things (IoT) and related technologies continue to increase the number, variety and capabilities of circuit devices, there is expected to be an increasing premium placed on improvements to device authentication.

BRIEF DESCRIPTION OF THE DRAWINGS

The various embodiments of the present invention are illustrated by way of example, and not by way of limitation, in the figures of the accompanying drawings and in which:

FIG. 2 shows a flow diagram illustrating elements of a method to bias a circuit according to an embodiment.

FIG. 3B shows tables each illustrating respective conditions provided to bias a circuit according to a corresponding embodiment.

FIG. 7 shows a flow diagram illustrating elements of a method to bias a circuit according to an embodiment.

DETAILED DESCRIPTION

Figure 1:
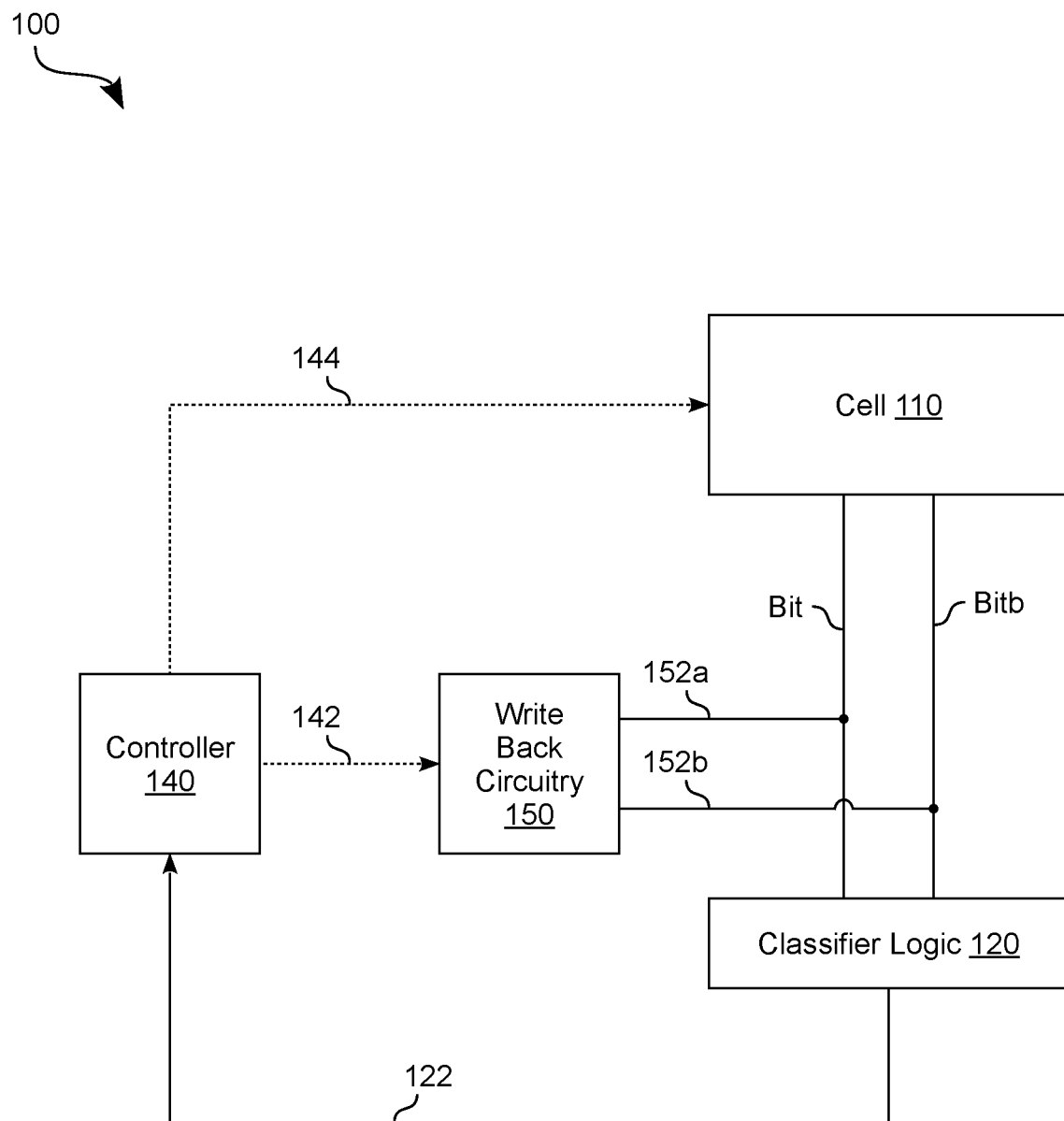
FIG. 1 shows a functional block diagram illustrating elements of a device to apply stress to a circuit according to an embodiment.

Embodiments discussed herein variously provide techniques and mechanisms for changing a consistency with which a particular type of circuit (referred to herein as a "cell circuit") settles into a given state. As used herein, "cell circuit" (or simply "cell") refers to a circuit, comprising two nodes, which is able to automatically settle into a first state, wherein, during that first state, complementary signals are provided each at a different respective node. Such signals are complementary to each other, for example, insofar as they indicate different respective logic states—e.g., logic low ("0") and logic high ("1"). The first state of a given cell circuit is to be contrasted, for example, from a second state that the cell circuit could settle into, at least potentially. During a first state, for example, a high logic signal is provided at a first node while a low logic signal is provided at a second node—e.g., wherein, during a second state, a low logic signal is instead provided at the first node while a high logic signal is provided at the second node In an embodiment, a cell circuit is characterized by a likelihood of settling into a particular one of a first state or a second state—e.g., the settling after the cell has been placed in another "reset" state. This likelihood behavior is identified, for example, by performing multiple cycles of reset-and-read operations, each cycle giving the cell an opportunity to settle into either state. With respect to a given cell, the more currently likely state of the cell is referred to as the "preferred state" of that cell.

A cell circuit which is very likely to settle into the same particular one of a first state or a second state (e.g., at least to some minimum threshold probability level) is useful, for example, for physically unclonable function ("PUF") applications. By contrast, a cell circuit is useful for random number generation ("RNG") applications where, for example, a likelihood of the cell circuit settling into a first state is close (e.g., within some maximum threshold difference in probabilities) to a likelihood of that cell circuit settling into a second state.

Some embodiments variously subject a cell circuit to conditions which stress one or more components thereof, wherein such stressing is to effect a change to the cell circuit's behavior (where, in this context, "behavior" refers to the likelihood of the cell circuit settling into a given state). Stressing which causes cell behavior to be more consistent is described herein as biasing a cell toward PUF behavior (and away from RNG behavior). By contrast, stressing which causes cell behavior to be less consistent is described herein as biasing a cell toward RNG behavior (and away from PUF behavior).

In some embodiments, stressing increases—or "hardens"—a cell's PUF behavior (or alternatively, RNG behavior)—e.g., wherein a PUF-type cell exhibits more consistent PUF behavior as a result, or wherein an RNG-type cell exhibits more random RNG behavior as a result. Alternatively or in addition, stressing can weaken a type of cell behavior—e.g., by decreasing the consistency of a cell's PUF-type behavior (or, for example, decreasing the randomness of a cell's RNG-type behavior). In some embodiments, stressing results in a cell transitioning between exhibiting PUF-cell behavior and exhibiting RNG-cell behavior.

Some embodiments variously facilitate a type of cell stressing, referred to herein as hot carrier injection (HCI), wherein, for example, a relative polarity of two supply voltages (with respect to each other) is inverted to enable stressing via a reverse transistor current. Hot carrier injection occurs when certain amount of carriers, along a MOSFET channel, gain sufficient kinetic energy and bombard gate dielectric near the drain side. The term hot refers to the effective carrier temperature relative to the lattice temperature. Some embodiments variously exploit an exponential increase of PMOS subthreshold (e.g., subfin) leakage, as a result of PMOS hot carrier injection, to change cell behavior by selectively changing PMOS current leakage characteristics.

Other embodiments variously select or otherwise identify a type of stressing which is to be applied to a particular first cell circuit of a cell array comprising multiple cell circuits. Such identifying is based, for example, on the behavior of the first cell circuit, and further based on the respective behaviors of one or more other cell circuits of the cell array. In some embodiments, stressing of the array results in different cell circuits being variously biased each toward a respective one of PUF behavior or RNG behavior—e.g., wherein the array is to provide PUF functionality with one or more cells, and RNG functionality with one or more other cells.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including one or more cell circuits and circuitry to apply a stress to some or all of the one or more cell circuits.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Here, multiple non-silicon semiconductor material layers may be stacked within a single fin structure. The multiple non-silicon semiconductor material layers may include one or more "P-type" layers that are suitable (e.g., offer higher hole mobility than silicon) for P-type transistors. The multiple non-silicon semiconductor material layers may further include one or more "N-type" layers that are suitable (e.g., offer higher electron mobility than silicon) for N-type transistors. The multiple non-silicon semiconductor material layers may further include one or more intervening layers separating the N-type from the P-type layers. The intervening layers may be at least partially sacrificial, for example, to allow one or more of a gate, source, or drain to wrap completely around a channel region of one or more of the N-type and P-type transistors. The multiple non-silicon semiconductor material layers may be fabricated, at least in part, with self-aligned techniques such that a stacked CMOS device may include both a high-mobility N-type and P-type transistor with a footprint of a single transistor.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

It is pointed out that those elements of the figures having the same reference numbers (or names) as the elements of any other figure can operate or function in any manner similar to that described, but are not limited to such.

FIG. 1 shows features of a device 100 to apply a biasing stress to a cell circuit according to an embodiment. Device 100 is one example of an embodiment wherein circuitry is operable to apply hot carrier injection stress by driving a reverse current of at least one transistor.

As shown in FIG. 1, circuitry of device 100 includes (or alternatively, is to couple to) a cell circuit such as the illustrative cell 110 shown. As further detailed herein, cell 110 is any of a variety of cell circuits which comprise two nodes and two PMOS transistors (not shown) which are each coupled between a first voltage rail—e.g., a supply voltage rail—and a different respective one of the two nodes. Operation of said PMOS transistors is based in part on a connection of the first voltage rail to respective gate terminals of the PMOS transistors.

In the example embodiments shown, classifier logic 120 of device 100 is to couple to cell 110 via signal lines Bit, Bitb which enable communication of respective signals from the two nodes of cell 110. Classifier logic 120 is an example of circuit logic (e.g., comprising hardware and/or executing software) which is to receive at least one signal—e.g., including one or both of respective signals communicated via Bit, Bitb—which indicates a settled state of cell 110.

In an example scenario according to one embodiment, cell 110 is reset and allowed to settle into a given state—e.g., where such resetting and settling is based on a first voltage and a second voltage provided, respectively, at the first voltage rail and a second voltage rail (not shown) each coupled to cell 110. During this resetting and settling, the first voltage and second voltage have a first relative polarity with respect to each other—e.g., wherein the first voltage is greater than the second voltage. During a reset and settling of cell 110, the second voltage rail provides a ground voltage, for example. After it has settled into a particular state, cell 110 provides first complementary signals each at a different respective one of the first node and the second node—e.g., wherein the first complementary signals are each communicated to classifier logic 120 via a different respective one of signal lines Bit, Bitb.

Based on one or both of the signals received via signal lines Bit, Bib, classifier logic 120 performs one or more operations to classify cell 110 based on its behavior. Such one or more operations comprise, for example, classifier logic 120 identifying the settled state of cell 110 and determining—e.g., based on multiple cycles which each reset and read cell 110—a likelihood of cell 110 settling into that state. In some embodiments, the one or more operations further comprise identifying cell 110 as belonging to one of a PUF-cell type or an RNG-cell type. Such a PUF-cell type is defined at least in part, for example, by a minimum threshold probability of a cell settling into a given state—e.g., wherein the RNG-cell type is defined at least in part by a maximum threshold difference between a probability of a cell settling into one state, and a probability of that same cell settling into an alternative state.

In some embodiments, classifier logic 120 communicates a signal 122 which, for example, specifies or otherwise indicates some or all of the settled state of cell 110, a likelihood of cell 110 settling into said state, and an identified behavior type (e.g., PUF or RNG) for cell 110. Signal 122 is received, for example, by logic of device 100 (such as the illustrative controller 140 shown) which determines a biasing stress to be applied at cell 110. Controller 140 comprises circuit logic (e.g., comprising hardware and/or executing software) which determines a correspondence of second complementary signals each to a different respective one of the first node or the second node of cell 110, where HCl stressing of cell 110 is to include communicating the second complementary signals to cell 110 according to the correspondence.

Based on the determined correspondence, controller 140 generates one or more control signals (e.g., including the illustrative control signals 142, 144 shown) to facilitate an application of HCl stress to cell 110. In the example embodiment shown, control signal 144 signals that the relative polarity, between the respective voltages at the first voltage rail and the second voltage rail, is to be reversed from what it was during the previous reset and read of cell 110. Control signal 142 is used—e.g., by write back circuitry 150 of device 100—to generate complementary signals 152a, 152b which are to be communicated back to the two nodes of cell 110 during the reversed polarity of the voltage rails. Such complementary signals 152a, 152b are referred to herein as "write back signals."

Due at least in part to the reversed polarity configured with control signal 144, the two PMOS transistors of cell 110 are each in a respective reverse bias during the communication of the complementary signals 152a, 152b. As a result, a reverse current of one such PMOS transistor is driven with one of complementary signals 152a, 152b to apply a transistor stress which is greater, for example, than a reverse current stress (if any) which is concurrently applied to the other PMOS transistor. In FIG. 1, the complementary signals 152a, 152b are shown as being variously provided to the two nodes of cell 110 via signal lines Bit, Bitb. However, in other embodiments, such write back signals are instead provided to the nodes via respective paths which are each independent of signal lines Bit, Bitb.

FIG. 2 shows features of a method 200 to bias a circuit according to an embodiment. Method 200 includes operation of some or all of device 100, for example. As shown in FIG. 2, method 200 includes (at 210) receiving a signal indicating a preferred state of a cell circuit, wherein, during the preferred state, the cell circuit provides first complementary signals each at a different respective one of a first node and a second node. The receiving at 210 comprises, for example, classifier logic 120 receiving respective signals via signal lines Bit, Bib of device 100. The cell circuit (e.g., cell 110) comprises PMOS transistors M1, M2 which are each coupled between a first voltage rail and a different respective one of the first node or the second node. For each of the PMOS transistors M1, M2, a gate terminal of the transistor is coupled to a source terminal of the transistor (e.g., where the respective gate terminal and source terminal of one of transistors M1 and M2 are each coupled to the first voltage rail). In some embodiments, the cell circuit settles into the preferred state after a reset of said cell circuit—e.g., wherein the reset and settling occur during, and based on, a first relative polarity of a first voltage at the first voltage rail with respect to a second voltage at a second voltage rail.

In an embodiment, method 200 comprises determining a scheme to stress the cell circuit, where such determining is based on the signal received at 210. For example, method 200 further comprises (at 212) determining, based on the signal, a correspondence of second complementary signals each to a different respective one of the first node or the second node. Such determining includes, for example, identifying which node is to receive a logic high write back signal and which node is to receive a logic low write back signal. In some embodiments, the determining at 212 includes or is otherwise based on a temporal majority voting (TMV) evaluation of the cell circuit—e.g., wherein the TMV evaluation includes counting a number of instances of the cell circuit's settling into a given state during a set of successive cell resets.

In an embodiment, method 200 comprises operations to apply hot carrier injection stress to the cell circuit, wherein signals for applying such stress include the second complementary signals. For example, method 200 further comprises (at 214) reversing the relative polarity of the first voltage at the first voltage rail with respect to the second voltage at the second voltage rail. In one embodiment, the reversing at 214 comprises transitioning the first voltage from being in a range of 1 Volt (V) to 2 V to being 0 V—e.g., wherein the second voltage is transitioned from being 0 V to being in a range of 1 V to 2 V. However such voltage values are merely illustrative, and not limiting on other embodiments.

Method 200 further comprises (at 216) providing the second complementary signals—after the relative polarity is reversed at 214—to the first node and the second node, where such providing is according to the correspondence determined at 212. In an embodiment, the providing at 216 (during the reversed voltage polarity) results in one of transistors M1, M2 being stressed by a respective reverse current (one of currents Irev_1 and Irev_2)—e.g., wherein different respective reverse currents of transistors M1, M2 contribute to a differential between respective stressing of transistors M1, M2. Applying such stress increases a PUF behavior (or alternatively, an RNG behavior) of the cell circuit, for example. In some embodiments, the cell circuit exhibits (e.g., at least to some threshold level) one of PUF behavior or RNG behavior before the stress is applied, wherein—after the stress is applied—the cell circuit instead exhibits (at least to some other threshold level) the other of the PUF behavior or the RNG behavior.

Figure 3A:
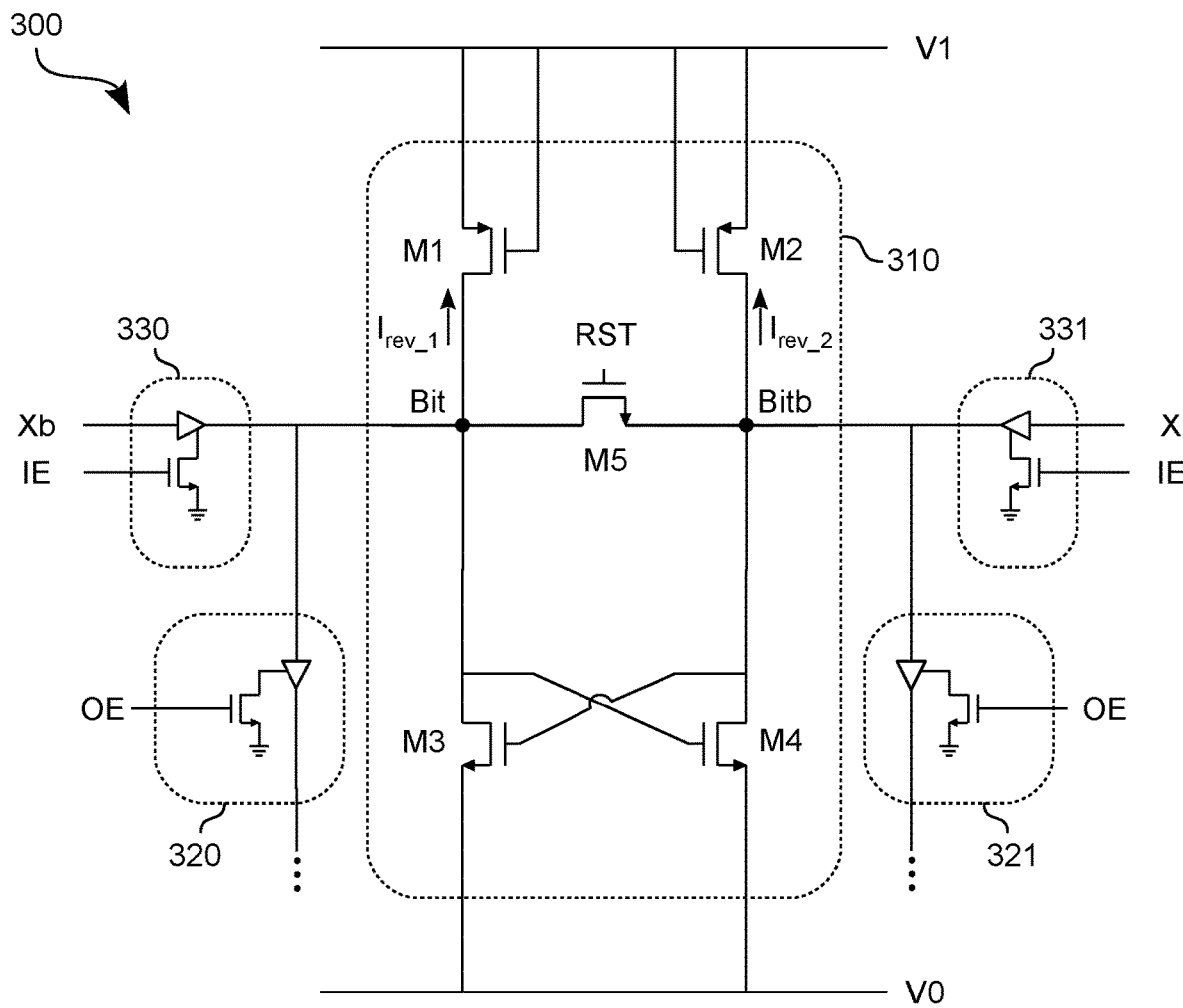
FIG. 3A shows a circuit diagram illustrating elements of an integrated circuit to apply a biasing stress according to an embodiment.

FIG. 3A shows features of an integrated circuit (IC) 300 to receive a biasing stress according to an embodiment. IC 300 is one example of an embodiment wherein a cell circuit is susceptible to an application of HCl stress—e.g., wherein circuitry coupled to the cell circuit accommodates some or all of a reset operation, a read operation and an HCl stress operation.

As shown in FIG. 3, IC 300 includes a cell 310 (e.g., cell 110) which is to receive a HCl stress, and input control circuits 330, 331 to facilitate the application of such stress. Furthermore, output control circuits 320, 321 of IC 300 facilitate, for example, a read operation on which the application of such HCl stress is based. Cell 310 is substantially left-to-right symmetrical (e.g., both in schematic and in layout), and is operable to provide complementary signals each at a different respective one of two nodes Bit, Bitb. In the example embodiment shown, cell 310 comprises PMOS transistors M1, M2 each coupled between a voltage rail V1 and a different respective one of nodes Bit, Bitb. For example, respective gate terminals and source terminals of M1, M2 are each coupled to rail V1. Cell 310 further comprises NMOS transistors M3, M4 which are each coupled between another voltage rail V0 and a different respective one of nodes Bit, Bitb. Respective gate terminals of M3, M4 are each cross-coupled to a respective other one of nodes Bit, Bitb.

In the example embodiment of IC 300, a reset of cell 310 takes place during, and based on, a first polarity of respective voltages at rails V0, V1—e.g., while a first voltage at rail V1 is greater than a second voltage at rail V0. Such a reset operation perturbs cell 310 by providing a temporary conductive path between nodes Bit, BitB—e.g., where cell 310 subsequently settles into a particular output state. For example, a transistor M5, coupled between nodes Bit, Bitb, provides such a conductive path in response to a reset control signal RST. During such a conductive path, nodes Bit, Bitb are each at or near the same voltage—e.g., near a trip voltage Vtrip between the respective voltages at rails V0, V1. Afterward, M5 is placed in an off state, and respective voltages at nodes Bit, Bitb are allowed to deviate from each other.

A subsequent read ("evaluation") of cell 310 takes place after the reset, and after nodes Bit, Bitb have been allowed to settle into a particular output state. For example, responsive to an output enable signal OE, output control circuits 320, 321 variously enable first complementary signals—each at a respective one of nodes Bit, Bitb—to be received or otherwise detected by classifier logic 120 or other such circuitry (not shown). The read operation also takes place during, and based on, the same first polarity of respective voltages at rails V0, V1.

In some embodiments, IC 300 includes or is to couple to circuit logic (not shown) which determines, based on such first complementary signals, how second complementary signals are to be provided as write back signals each to a different respective one of nodes Bit, Bitb. Such circuit logic determines, based on which of nodes Bit, Bitb output a logic high (or logic low) signal, which of a logic high signal and a logic low signal is be written back to a particular one of nodes Bit, Bitb. In some embodiments, such determining is based on a temporal majority voting (TMV) evaluation—e.g., wherein cell 310 is subjected to multiple reset-evaluation cycles, and where respective output states for such cycles are classified and counted to determine an output behavior of cell 310.

In an embodiment, a stress operation includes applying HCl stress based on a reversed polarity of the respective voltages at rails V0, V1—e.g., by applying a second polarity (opposite the first polarity) wherein the first voltage at rail V1 is less than the second voltage at rail V0. In the example of cell 310, such reversed polarity contributes to respective reversed-bias states of transistors M1, M2—e.g., wherein the complementary write back signals, during said states, result in a relatively high HCl stress of one of M1, M2 (as compared to the other of M1, M2). For example, responsive to an input enable signal IE, input control circuits 330, 331 variously enable second complementary signals Xb, X to be communicate each to a respective one of nodes Bit, Bitb.

FIG. 3A further shows a table 340 illustrating how different types of stressing (e.g., including HCl stressing), each according to a respective embodiment, variously bias a cell—such as cell 310—away from, or toward, a particular type of output behavior. In the scenario illustrated by the first row of table 340, a read operation determines that nodes Bit, Bitb output a logic low ("0") signal and a logic high ("1") signal, respectively. Biasing such a cell to increase PUF-type (consistent) output behavior includes signals Xb, X being logic high ("1") and logic low ("0"), respectively, where signals Xb, X are written back to nodes Bit, Bitb, respectively. By contrast (as illustrated in the third row of table 340), biasing such a cell to increase RNG-type output behavior includes signals Xb, X being logic low ("0") and logic high ("1"), respectively. The second and fourth rows of table 340, illustrate other types of biasing each for an alternative scenario wherein a read operation determines that nodes Bit, Bitb output a logic high ("1") signal, and a logic low ("0") signal, respectively.

Referring now to FIG. 3B, a table 350 illustrates scenarios each for biasing which is to increase PUF-type output behavior of a given cell. By contrast, a table 360 in FIG. 3B illustrates scenarios each for biasing which is to increase RNG-type output behavior of a given cell. More particularly, tables 350, 360 each illustrate two respective scenarios, one for a given cell of a cell type 1, the other for a given cell of a cell type 2. For cell type 1, the cell in question is relatively more likely to settle to an output state wherein nodes Bit, Bitb provide a logic low ("0") signal and a logic high ("1") signal, respectively. For cell type 2, the cell in question is relatively more likely to settle to the alternative output state.

Each scenario illustrated by tables 350, 360 includes a reset operation, an evaluation operation and a write back operation. Tables 350, 360 variously show—for each such operation of a given scenario—corresponding current states of the first voltage provided at rail V0, the second voltage provided at rail V1, the reset signal RST (provided, in this example, to transistor M5 of IC 300), the respective signals at nodes Bit, Bitb, the write back signals X, Xb, and the input enable signal IE. In an embodiment, input control signal IE is a complement OE# to the output enable signal OE provided to one or both of output control circuits 320, 321.

Figure 4:
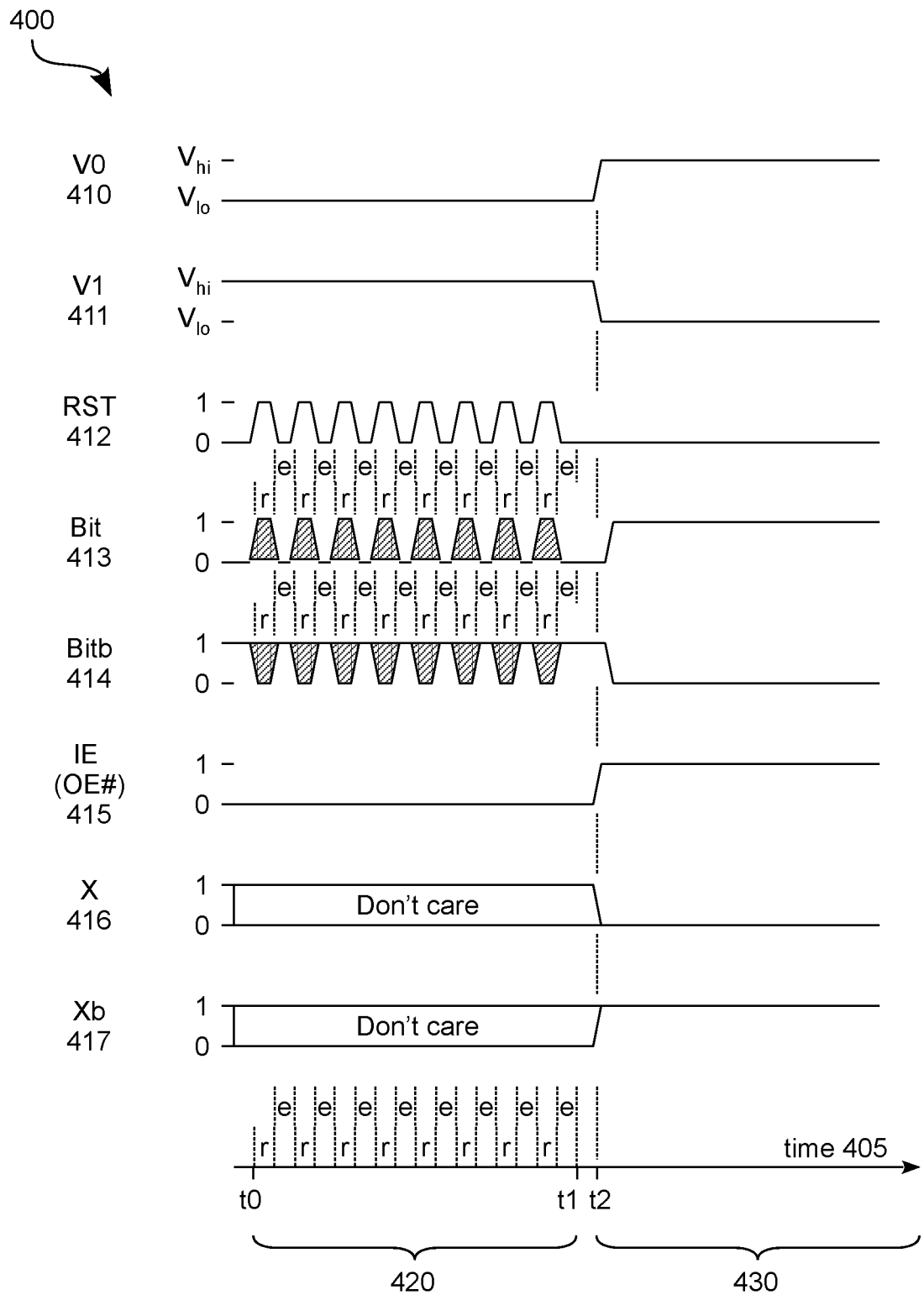
FIG. 4 shows a timing diagram illustrating conditions provided to apply a biasing stress of a circuit according to an embodiment.

FIG. 4 is a timing diagram 400 showing signals and voltages which, according to an embodiment, are variously provided to, or from, a cell circuit such as one of cells 110, 310 (for example). Timing diagram 400 illustrates an embodiment wherein a cell circuit is operated, for example, with circuitry of device 100 and/or according to method 200.

Timing diagram 400 shows certain conditions, over time 405, of a cell which is coupled to receive respective voltages from a first rail and a second rail (e.g., the cell 310 coupled to rails V0, V1). More particularly, timing diagram 400 shows a first voltage V0 410 provided at the first voltage rail, a second voltage V1 411 provided at the second rail, and a reset signal RST 412 to reset the cell (e.g., by operating transistor M5 of IC 300). Timing diagram 400 further shows a signal Bit 413 at a first output node of the cell, a signal Bitb 414 at a second output node of the cell, and input enable signal IE 415 which (in this example) is a complement OE# to an output enable signal OE. IE 415 is provided for example, to operate input control signals 330, 331. Timing diagram 400 further shows each of a first write back signal X 416 and a second write back signal Xb 417 which, during a write back, are provided, respectively, to the second node and to the first node.

In the example embodiment shown, a TMV evaluation of the cell includes or is otherwise based on reset operations (indicated by "r") and evaluation operations (indicated by "e") which are alternatively performed during a time period 420 between a time t0 and a time t1. Although eight reset-evaluation cycles are shown, more or fewer such cycles are performed, in other embodiments. Based on such reset-evaluation cycles—e.g., based on successive output states generated by the cycles—the cell is classified as exhibiting a particular output behavior. In the example shown, the cell is identified as belonging to the cell type 1 which is variously indicated in tables 350, 360.

In some embodiments, the cell is further identified as one which is to be stressed toward a particular output behavior—e.g., where (in the example shown) the cell is to be biased toward PUF-type behavior. Referring again to FIG. 3B, arrows are shown in table 350 to indicate a scenario such as that which is illustrated in timing diagram 400. Such stressing includes, for example, HCl stressing during a time period 430 starting at a time t2 after time t1. In an embodiment, such HCl stress includes or is otherwise based on the cell being subjected to a reversed voltage polarity—e.g., wherein V0 410 transitions from a relatively low voltage Vlo to a relatively high voltage Vhi, and wherein V1 411 transitions from Vhi to Vlo. In one such embodiment, the HCl stress further based on IE 415 being set to enable communication of write back signals X 416 and Xb 417 to the second output node and the first output node, respectively—e.g., while write back signals X 416 and Xb 417 are at a logic low, and logic high, respectively.

Figure 5:
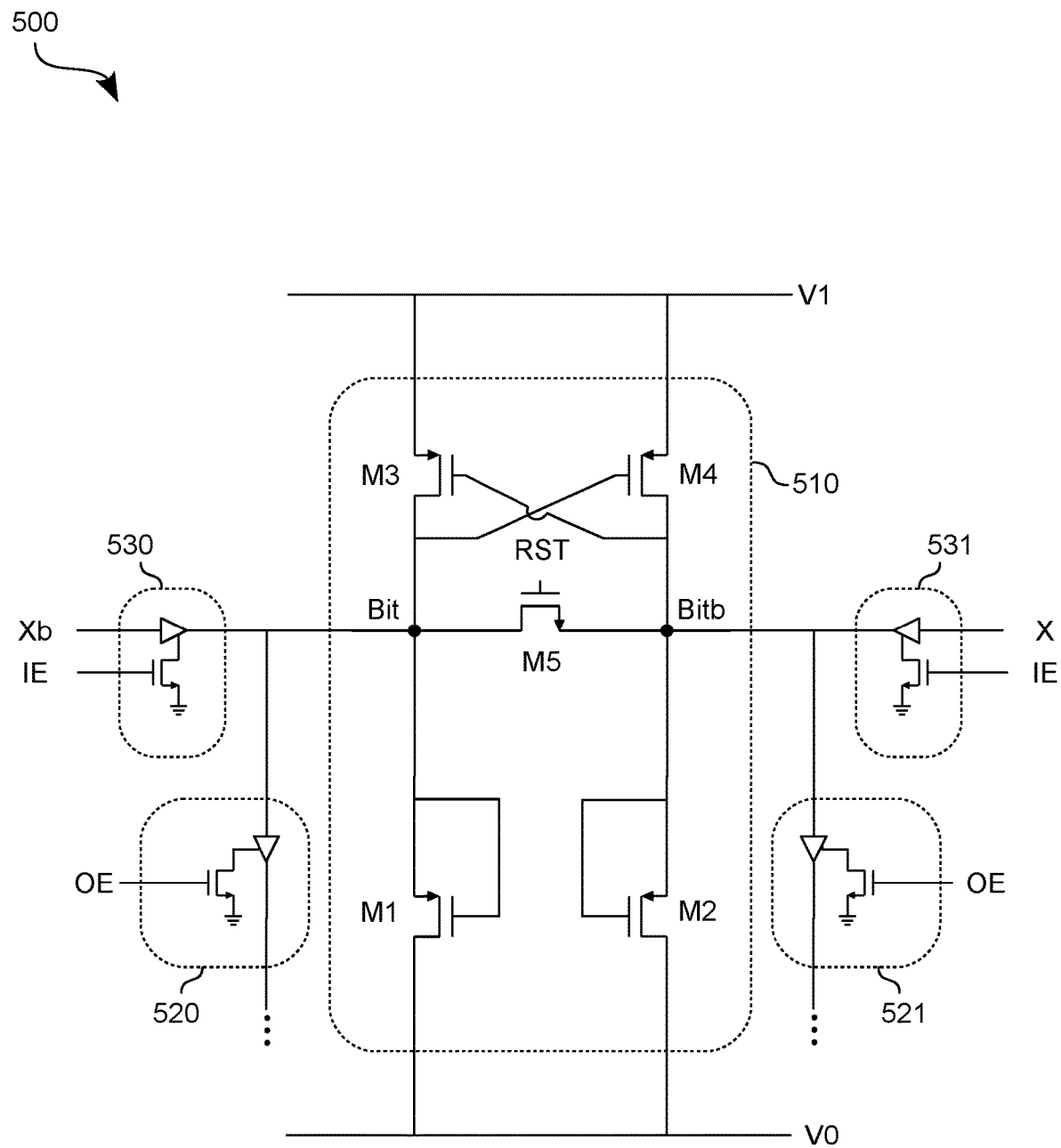
FIG. 5 shows a circuit diagram illustrating elements of an integrated circuit to provide a biasing according to an embodiment.

FIG. 5 shows features of an integrated circuit (IC) 500 to receive a biasing stress according to another embodiment. IC 500 includes features of cell 110, for example, and/or is operable according to method 200. As shown in FIG. 5, IC 500 includes a cell 510 (e.g., cell 110) which is to receive a HCl stress, and input control circuits 530, 531 to facilitate the application of such stress. Furthermore, output control circuits 520, 521 of IC 500 facilitate a read operation for determining the particular HCl stress to be applied. In the example embodiment shown, cell 510 comprises PMOS transistors M1, M2 each coupled between a voltage rail V0 and a different respective one of nodes Bit, Bitb. For each of the PMOS transistors M1, M2, a gate terminal of the transistor is coupled to a source terminal of the transistor. For example, a gate terminal and a source terminal of M1 are each coupled to node Bit, where a gate terminal and a source terminal of M2 are each coupled to node Bitb. Cell 510 further comprises PMOS transistors M3, M4 which are each coupled between another voltage rail V1 and a different respective one of nodes Bit, Bitb. Respective gate terminals of M3, M4 are each cross-coupled to a respective other one of nodes Bit, Bitb.

In the example embodiment of IC 500, a transistor M5 is coupled to facilitate a reset of cell 510 by selectively enabling a conductive path between nodes Bit, Bitb—e.g., in response to a reset control signal RST. A subsequent evaluation of cell 510 takes place after the reset, and after nodes Bit, Bitb have been allowed to settle into a particular output state. For example, responsive to an output enable signal OE, output control circuits 520, 521 of IC 500 variously enable first complementary signals—each at a respective one of nodes Bit, Bitb—to be received or otherwise detected by classifier logic (not shown). The reset and the evaluation each take place during, and based on, a first polarity of respective voltages at rails V0, V1—e.g., while a first voltage at rail V1 is greater than a second voltage at rail V0.

Based on the evaluation—e.g., based on TMV evaluation of cell 510—a scheme to stress 510 is identified. In one embodiment, stressing cell 510 includes applying HCl stress based on a reversed polarity of the respective voltages at rails V0, V1—e.g., by applying a second polarity (opposite the first polarity) wherein the first voltage at rail V1 is less than the second voltage at rail V0. Such reversed polarity contributes to respective reversed-bias states of transistors M1, M2—e.g., wherein complementary write back signals, provided during said states, result in a relatively high HCl stress of one of M1, M2 (as compared to the other of M1, M2). For example, responsive to an input enable signal IE, input control circuits 530, 531 variously enable second complementary signals Xb, X to be communicate each to a respective one of nodes Bit, Bitb.

Figure 6:
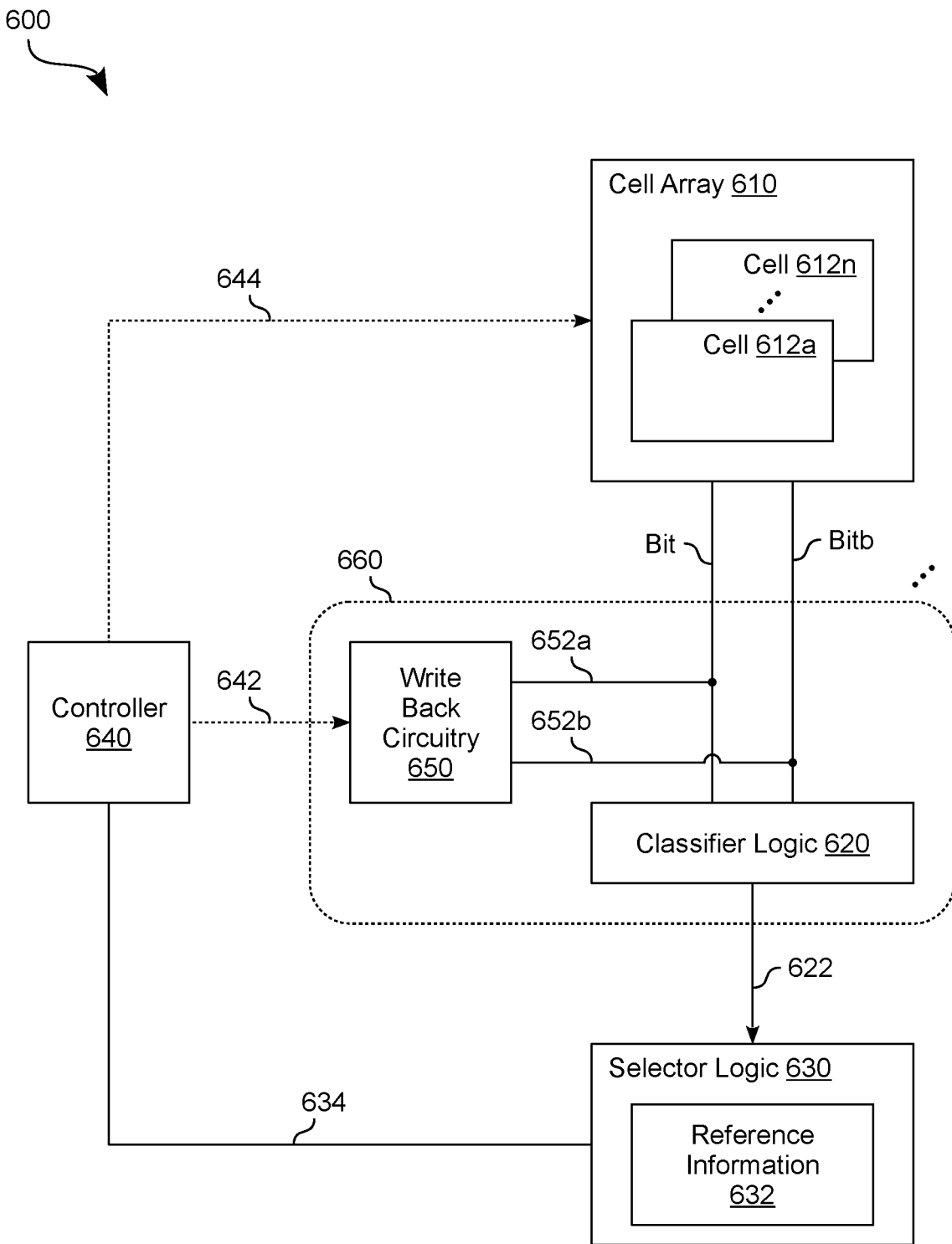
FIG. 6 shows a functional block diagram illustrating elements of a system to apply stress to a circuit according to an embodiment.

FIG. 6 shows features of a system 600 to apply a biasing stress to a cell circuit according to another embodiment. System 600 illustrates an example embodiment wherein circuitry is operable to apply stress to one cell of an array of cells, wherein the stress is applied based on both behavior of that cell and behavior of another cell of the array. In some embodiments, different types of stress are variously applied to bias one or more cells toward PUF behavior, and further to bias another one or more cells toward RNG behavior.

As shown in FIG. 6, circuitry of system 600 includes (or alternatively, is to couple to) an array of cell circuits, such as the illustrative cell array 610 shown. Cell array (or for brevity, "array") 610 comprises multiple cells—e.g., including the cells 612a, . . . , 612n—which each exhibit a respective likelihood to settle into a particular one of two possible states. As described in further detail herein, array 610 comprises cells that (for example) are arranged in rows and columns—e.g., wherein at least some circuitry of 600 is (re)configurable to variously reset, read from and/or write back to any of multiple cells.

In the example embodiment shown, system 600 comprises classifier logic 620, controller 640, and write back circuitry 650 which (for example) correspond functionally to classifier logic 120, controller 140, and write back circuitry 150, respectively. In one such embodiment, evaluating the behavior of a given cell comprises classifier logic 620 receiving first complementary signals, via signal lines Bit, Bitb, each from a respective node of that cell. Based on these first complementary signals, classifier logic 620 identifies a state into which the cell has settled. In some embodiments, classifier logic 620 further determines (for example) a likelihood that the cell will settle into a particular state—e.g., where the likelihood is determined based on TMV evaluation of the cell. A signal 622, identifying such classification of cell behavior, is subsequently used to determine a stress (if any) which is to be applied to that cell or, for example, to another cell. Where cell stress is to be applied via signal lines Bit, Bitb, for example, write back circuitry 650 provides second complementary signals 652a, 652b each to a respective one of signal lines Bit, Bitb.

In some embodiment, stress is applied to a cell of array 610 by providing particular supply voltage conditions and/or temperature conditions during the communication of second complementary signals 652*a*, 652*b*. Said conditions are configured (for example) based on a voltage control signal 644 from controller 640—e.g., where the second complementary signals 652*a*, 652*b* are generated responsive to a control signal 642 from controller 640. Control signal 644 determines a supply voltage condition, for example, by changing a voltage level provided, via a respective voltage rail (not shown), to one or more cells. In various embodiment, cell stress is applied using one of negative bias temperature instability (NBTI) stress, positive bias temperature instability (PBTI) stress, hot carrier stress (e.g., using a transistor on-current or, alternatively, a transistor off-current), and/or any of various other stressing techniques. However, some embodiments are not limited to particular supply voltage conditions or temperature conditions under which stress is applied using the second complementary signals 652*a*, 652*b*.

In some embodiments, controller 640 applies cell stress based on a communication with selector logic 630 of system 600. Selector logic 630 is coupled to receive one or more signals—e.g., including signal 622—which each describe a classification of cell behavior for a respective one of cells 612*a*, . . . , 612*n*. Based on said one or more signals, hardware and/or executing software of selector logic 630 identifies, for each of multiple cells (e.g., including cells 612*a*, . . . , 612*n*), whether the cell is one of a PUF cell type or an RNG cell type. For example, selector logic 630 identifies a first cell of array 610 as being of a first one of the PUF cell type or the RNG cell type, and also identifies a second cell of array 610 as being of a second cell type which is also one of the PUF cell type or the RNG cell type. Selector logic 630 further identifies, for least one such cell, a preferred state of the cell—i.e., a state into which the cell is currently more likely to settle after any given reset of said cell. For example, selector logic 630 identifies a probability value (or other such data) indicating a likelihood of the cell settling into its preferred state.

Based on such cell behavior information—e.g., based at least on each of the identified first cell type and the identified second cell type—selector logic 630 selects or otherwise determines a type of biasing which is to be applied to at least one cell of array 610. Such determining is further based, for example, on some pre-configured state (e.g., including the illustrative reference information 632 shown) which specifies or otherwise indicates one or more rules and/or other criteria for identifying a number of PUF cells to be provided with array 610 and/or a number of RNG cells to be provided with array 610. Such criteria include, but are not limited to, one or more of: a threshold minimum (or maximum) number of cells which are to be of the RNG cell type, a threshold minimum (or maximum) number of cells which are to be of the PUF cell type, a threshold minimum (or maximum) ratio of RNG cells to PUF cells, a threshold minimum likelihood that a PUF cell will settle into its preferred state, a threshold maximum likelihood that an RNG cell will settle into a particular state, or the like. Such rules/criteria indicate a threshold number of cells for only a subset of all cells of array 610—e.g., wherein reference information 632 specifies, for a given column (or row) of array 610, a required minimum number of cells in that column (row) which are to operate as RNG cells. Alternatively or in addition, one or more threshold numbers pertain to all cells of array 610. Criteria such as that indicated by reference information 632—e.g., criteria provided by a manufacturer, system engineer or other authority—varies significantly in different embodiments, according to implementation-specific details. A specific type and/or value of such criteria is not limiting on some embodiments.

In various embodiments, selector logic 630 determines a count of cells which currently satisfy (or alternatively, fail to satisfy) some criteria. Alternatively or in addition, selector logic 630 ranks some plurality of cells relative to each other—e.g., where such ranking is based on the cells' respective likelihoods to transition into a particular state. In one such embodiment, selector logic 630 selects one or more cells from a plurality of cells based on such ranking. For example, selector logic 630 identifies, in some embodiments, a cell which, of some plurality of cells each belonging to a PUF-cell type, exhibits the weakest (e.g., most inconsistent) PUF cell behavior. Alternatively or in addition, selector logic 630 identifies a cell which, of some plurality of cells each belonging to an RNG-cell type, exhibits the weakest (e.g., least random) RNG cell behavior.

Based on such operations, selector logic 630 is able to determine some required operational characteristic of array 610, identify one or more candidate cells be biased in order to provide the required operational characteristic, and communicate a particular cell stressing which to be applied to said one or more candidate cells. For example, a signal 634 from selector logic 630 identifies to controller 640 the one or more candidate cells, and the cell stressing to be applied.

In some embodiments, read access and write access to any of multiple cells of array 610 is provided by the same circuitry of system 600. For example, read/write circuitry 660, which comprises classifier logic 620 and write back circuitry 650, provides access to at least some of cells 612*a*, . . . , 612*n*. In one such embodiment, other circuitry (not shown) of system 600 provides read-write functionality similar to that of circuitry 660, but only to access cells of array 610 other than those which are accessed using read/write circuitry 660. For example different columns (or rows) of array 610 are variously accessed each with different respective read/write circuitry, in some embodiments. In various embodiments, the different read/write circuitry are each coupled to provide cell classification information to selector logic 630.

FIG. 7 shows features of a method 700 to selectively apply a biasing stress to a cell circuit according to an embodiment. Method 700 illustrates an example embodiment wherein one cell of an array of cells is stressed based on both behavior of that cell and behavior of another cell of the array. Method 700 includes operation of some or all of system 600, for example.

As shown in FIG. 7, method 700 comprises (at 710) identifying a first cell circuit of a cell array as being of a first cell type which is one of a physically unclonable function (PUF) cell type or a random number generator (RNG) cell type. Method 700 further comprises (at 712) identifying a second cell circuit of the cell array as being of a second cell type which is one of the PUF cell type or the RNG cell type. In an embodiment, the various identifying at 710 and 712 includes, or is otherwise based on, TMV and/or other evaluation of cell behavior—e.g., by classification logic 620.

Method 700 further comprises (at 714) determining a preferred state of the first cell circuit, wherein, during the preferred state, two nodes of the first cell circuit each provide a different respective one of first complementary signals. In an example embodiment, the determining at preferred state at 714 includes classification logic 620 determining, based on signal 622, a probability that the first cell circuit will settle into a particular state of two possible states.

Method 700 further comprises (at 716) identifying a stress scheme based on each of the preferred state, the first cell type and the second cell type. In some embodiments, identifying the stress scheme at 716 is further based on a threshold value such as one indicated by reference information 632. For example, the threshold value includes or is otherwise is based on a threshold number of cells, in a column or row of the cell array, which are to be of the RNG cell type—e.g., wherein the column or row comprises the first cell circuit. In another embodiment, such a threshold value includes or is otherwise based on a threshold ratio of a number of cell circuits which are to be of the PUF cell type, to a number of cell circuits which are of the RNG cell type In some embodiments, the identifying at 716 includes or is otherwise based on, a selection of the first cell from among other possible cells to be biased. In one such embodiment, method 700 further comprises evaluating, for each cell circuit of multiple cell circuits of the cell array, a respective likelihood that the cell circuit will settle to a first state. Based on such evaluating, method 700 selects the first cell circuit from among the multiple cell circuits, wherein the stressing of the first cell circuit is based on the selecting. For example, the first cell circuit is selected as a weakest (least consistent) PUF cell, or a weakest (least random) RNG cell, of the multiple cell circuits. In one embodiment, such selection is based on a determination that, of the multiple cell circuits, the first cell circuit is most easily transitioned between being of the PUF cell type and being of the RNG cell type.

In an embodiment, method 700 further comprises (at 718) stressing the first cell circuit according to the scheme which is identified at 716. The stressing at 718 comprises providing second complementary signals each at a different respective node of the two nodes. Based on the stressing, the first cell circuit more strongly exhibits a characteristic of the RNG cell type, in some embodiments. Alternatively, the stressing results in the first cell circuit more strongly exhibiting a characteristic of the PUF cell type. In some embodiments, the stressing at 718 results in a transition of the first cell circuit between being of the PUF cell type and being of the RNG cell type.

Figure 8:
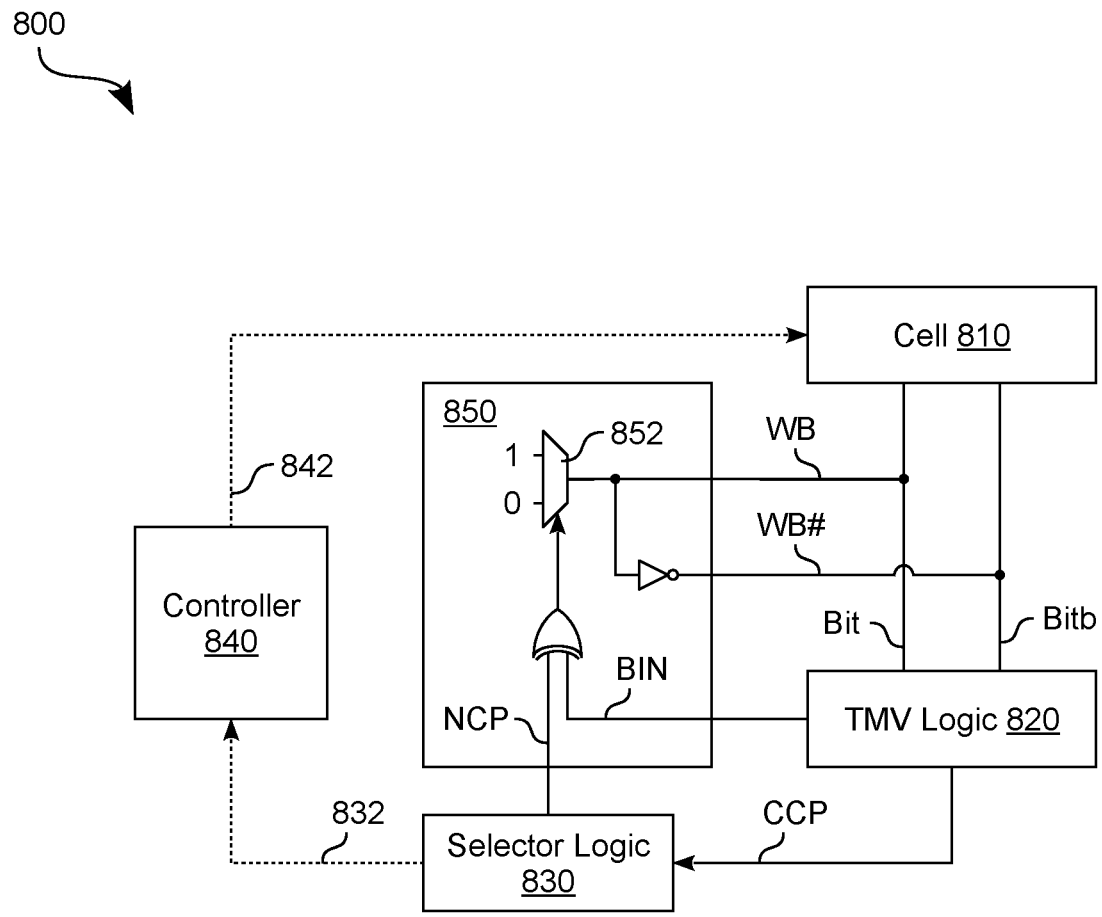
FIG. 8 shows a functional block diagram illustrating elements of a system to apply a biasing stress to a circuit according to an embodiment.

FIG. 8 shows features of a system 800 to apply a biasing stress to a cell circuit according to another embodiment. System 800 illustrates an example embodiment wherein complementary write back signals, to be communicated back to a cell of a cell array, are generated based on signals indicating cell behavior information. System 800 includes some or all features of system 600—e.g., wherein operation of system 800 is according to method 700.

As shown in FIG. 8, circuitry of system 800 includes (or alternatively, is to couple to) a cell 810 of an array, such as array 610, comprising multiple cells which each exhibit a respective likelihood to settle into a particular one of two possible states. In the example embodiment shown, system 800 comprises TMV logic 820, selector logic 830, controller 840, and write back circuitry 850 which (for example) correspond functionally to classifier logic 620, selector logic 630, controller 640, and write back circuitry 650, respectively.

During operation of system 800, TMV logic 820 performs a TMV evaluation—based on complementary signals received from two nodes of cell 810 via signal lines Bit, Bitb—to classify the behavior of cell 810. Based on such TMV evaluation, TMV logic 820 generates a signal BIN which indicates a current preferred state of cell 810—i.e., a state which cell 810 is currently more likely, on average, to settle into after a given cell reset. TMV logic 820 also generates a signal CCP which indicates a cell type to which cell 810 has been identified as belonging. Signals BIN and CCP are communicated, respectively, to write back circuitry 850 and selector logic 830. Based on CCP and behavior information for other cells (not shown) of the array—and, for example, based on criteria such as that provided by reference information 632—selector logic 830 generates a signal NCP which indicates a selected direction of biasing for cell 810. A signal 832 from selector logic 830 to controller 840 communicates, for example, some or all of an identifier of cell 810, a currently preferred state of cell 810, and a direction of biasing to be applied to cell 810.

FIG. 8 further shows a table 801 which illustrates, for each of various scenarios, how a multiplexer 852 of write back circuitry 850 is operated, based on the signals BIN, NCP, to generate complementary write back signals WB, WB#. To provide a desired stress of cell 810, signals WB, WB# are communicated—via signal lines Bit, Bitb, respectively—during a voltage condition provided (for example) responsive to a control signal 842 from controller 840. Referring now to table 801, BIN being at a logic high ("1") state indicates that the currently preferred state of cell 810 includes, or otherwise results in, signal lines Bit, Bitb communicating, respectively, a logic low ("0") signal, and a logic high ("1") signal. Furthermore, NCP being at a logic high ("1") state indicates that cell 810 is to be biased toward stronger PUF cell behavior—e.g., where NCP being at a logic low ("0") state instead indicates that cell 810 is to be biased toward stronger RNG cell behavior.

Figure 9A:
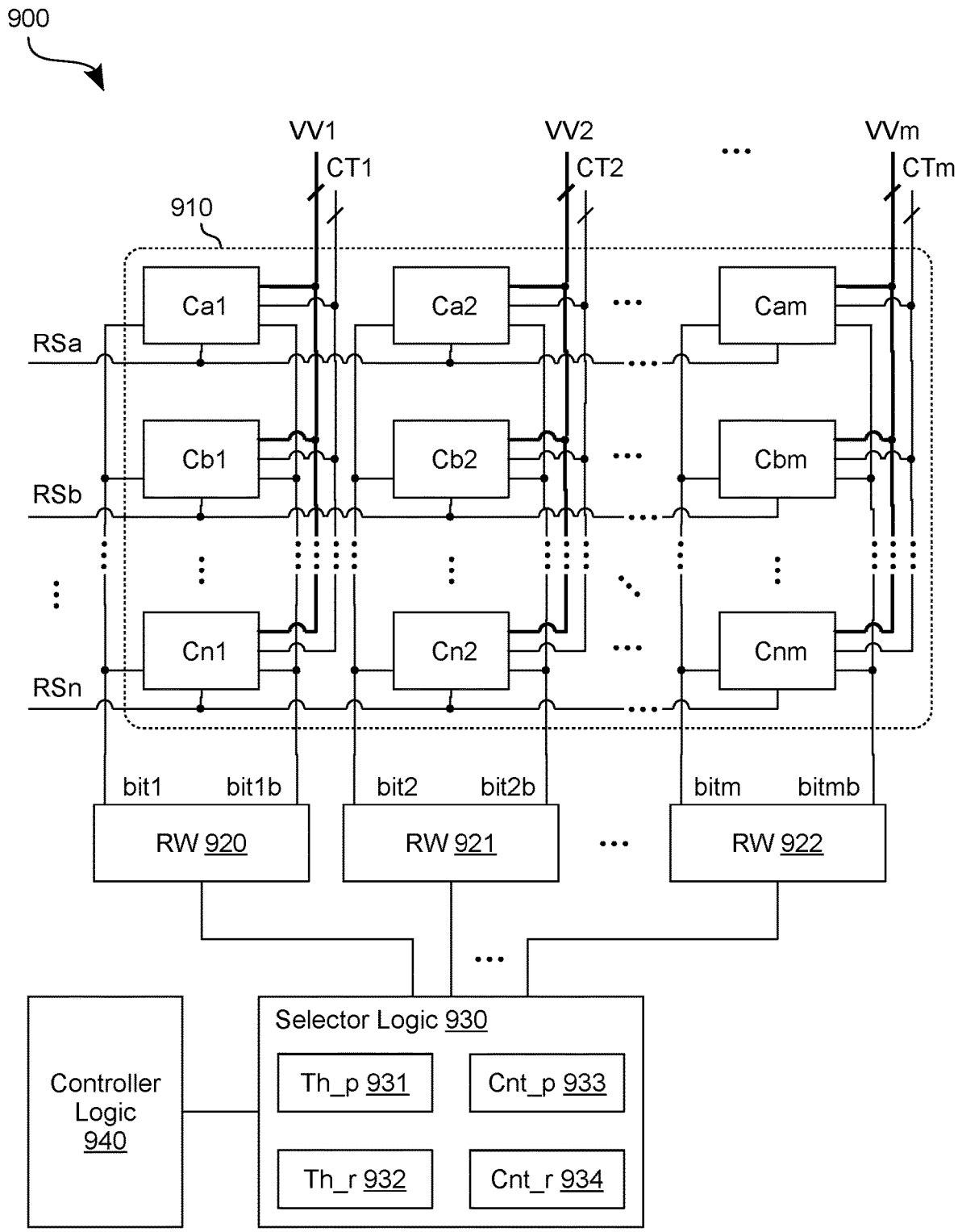
FIG. 9A shows a functional block diagram illustrating elements of a system to stress a circuit according to an embodiment.

FIG. 9A shows features of a system 900 to apply stress to a cell circuit according to an embodiment. System 900 includes features of one of systems 600, 800 and/or is operable according to method 700, for example. In the example embodiment shown, system 900 comprises a cell array 910, selector logic 930, and controller logic 940 which (for example) correspond functionally to cell array 610, selector logic 630, and controller 640. As shown in FIG. 9A, array 910 comprises an n-by-m arrangement of cells (where n and m are respective positive integers) which form a first row comprising cells Ca1, Ca2, . . . , Cam—e.g., wherein a second row includes cells Cb1, Cb2, . . . , Cbm, and an nth row includes cells Cn1, Cn2, . . . , Cnm. In such an embodiment, a first column of array 910 includes cells Ca1, Cb1, . . . , Cn1, wherein a second column includes cells Ca2, Cb2, . . . , Cn2, and wherein an mth column includes cells Cam, Cbm, . . . , Cnm. In another embodiment, system 900 omits, but is configured to couple to, array 910.

System 900 further comprises read/write (RW) circuits 920, 921, . . . , 922 which, for example, each provide respective functionality of read/write circuitry 660. For example, RW circuit 920 is operable to communicate complementary signals to (or from) any of cells Ca1, Cb1, . . . , Cn1 via signal lines bit1, bit1*b*. Similarly, RW circuit 921 is operable to communicate complementary signals to (or from) any of cells Ca2, Cb2, . . . , Cn2 via signal lines bit2, bit2*b*—e.g., wherein RW circuit 922 is operable to communicate complementary signals to (or from) any of cells Cam, Cbm, . . . , Cnm via signal lines bitm, bitmb.

In various embodiments, selector logic 930 monitors or otherwise determines the behavior of various cells in array 910. For example, selector logic 930 variously communicates with RW circuits 920, 921, . . . , 922 and calculates, based on such communications, a count Cnt_p 933 of a number of cells which, currently, are identified as belonging to a PUF-cell type. Alternatively or in addition, selector logic 930 calculates, based on such communications, a count Cnt_r 934 of a number of cells which, currently, are identified as belonging to an RNG-cell type. Other such array state information is additionally or alternatively determined by selector logic 930, in various embodiments.

Based on such array state information—e.g., in combination with performance criteria such as that provided by reference information 632—selector logic 930 selects at least one cell and a biasing to be applied to that cell. In an example scenario according to one embodiment, a cell is selected for biasing toward PUF behavior based on Cnt_p 933 and a threshold number Th_p 931 of cells that, according to a performance criteria, are to operate as PUF cells. Alternatively or in addition, a cell is selected for biasing toward RNG behavior based on Cnt_r 934 and a threshold number Th_r 932 of cells that, according to a performance criteria, are to operate as RNF cells. Cell biasing is determined based on any of various other types of performance criteria, in various embodiments.

Responsive to selector logic 930, controller logic 940 and one of RW circuits 920, 921, . . . , 922 variously provide signaling to stress the selected cell. For example, the one of RW circuits 920, 921, . . . , 922 provides two complementary write back signals—via a corresponding one of the pairs of signal lines (bit1, bit1b), (bit2, bit2b), . . . , (bitm, bitmb)—wherein the write back signals are based on both the preferred state of the cell in question and, and a direction in which the cell is to be biased.

Stressing of the selected cell is due at least in part to a voltage condition (and in some embodiments, a temperature condition) of array 910 which is provided during communication of said write back signals—e.g., wherein such providing is responsive to controller logic 940. For example, controller 940 selectively enables stressing of a cell of the first column (i.e., one of cells Ca1, Cb1, . . . , Cn1) using some or all of one or more voltages VV1, and one or more control signals CT1. Alternatively or in addition, controller 940 selectively enables stressing of a cell of the second column (i.e., one of cells Ca2, Cb2, . . . , Cn2) using some or all of one or more voltages VV2, and one or more control signals CT2. Alternatively or in addition, controller 940 selectively enables stressing of a cell of the mth column (i.e., one of cells Cam, Cbm, . . . , Cnm) using some or all of one or more voltages VVm, and one or more control signals CTm. In one such embodiment, stressing of a particular cell is further enabled based on a signal to select a row which includes the cell—e.g., based on one of the illustrative row select signals RSa, RSb, . . . , RSn shown.

Figure 9B:
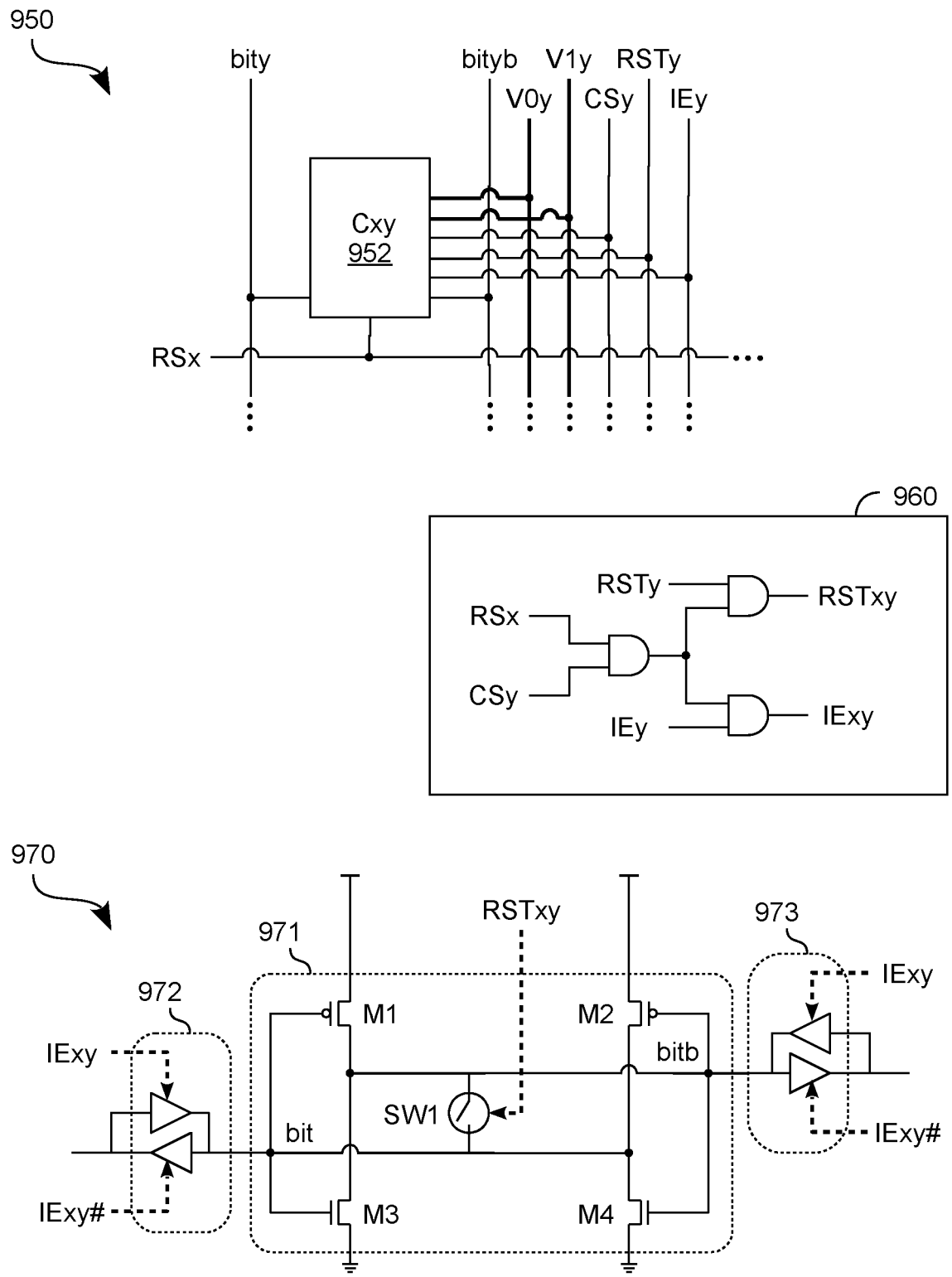
FIG. 9B shows a block diagram and circuit diagrams variously illustrating elements of circuitry to provide a biasing stress according to an embodiment.

FIG. 9B shows a detailed example of an array 950 (such as array 910) to receive a biasing stress according to an embodiment. As shown in FIG. 9B, array 950 includes a cell Cxy 952 which is coupled to receive one or more voltages, and to communicate one or more signals, which facilitate such stressing. For example, signal lines bity, bityb are each coupled to a respective node of Cxy 952, where signal lines bity, bityb facilitate communication of two complementary signals to or from read/write circuitry (such as one of RW circuits 920, 921, . . . , 922). In an example embodiment, Cxy 952 is further coupled to receive a first voltage V0y and a second voltage V1y which, for example, are provided to all cells of a column y which includes Cxy 952. Responsive to control logic 940 (for example), one or both of voltages V0y, V1y are changed to provide a voltage condition which enables stressing of Cxy 952. Other signals coupled to control Cxy 952 include, for example, a column select signal CSy, a reset signal RSTy, and an input enable signal IEy (which, in an embodiment, are each further coupled to all other cells of column y). In some embodiments, such other signals further comprise a row select signal RSx which, for example, is further coupled to all other cells of a row x which includes Cxy 952.

FIG. 9B further shows circuit diagrams 960, 970 which illustrate one example of how, according to one embodiment, control signals CSy, RSTy, IEy, and RSx are used to generate cell-specific control signals including a reset signal RSTxy, an input enable signal IExy, and a complementary output enable signal IExy#. As shown in circuit diagram 970, cell circuitry 971 (including transistors M1, M2, M3, M4) is reset by providing reset signal RSTxy to a switch SW1 coupled between nodes bit, bitb. Responsive to signals IExy, IExy# input/output circuits 972, 973 are operable to selectively enable or disable communication of respective signals to (or from) nodes bit, bitb.

Figure 9C:
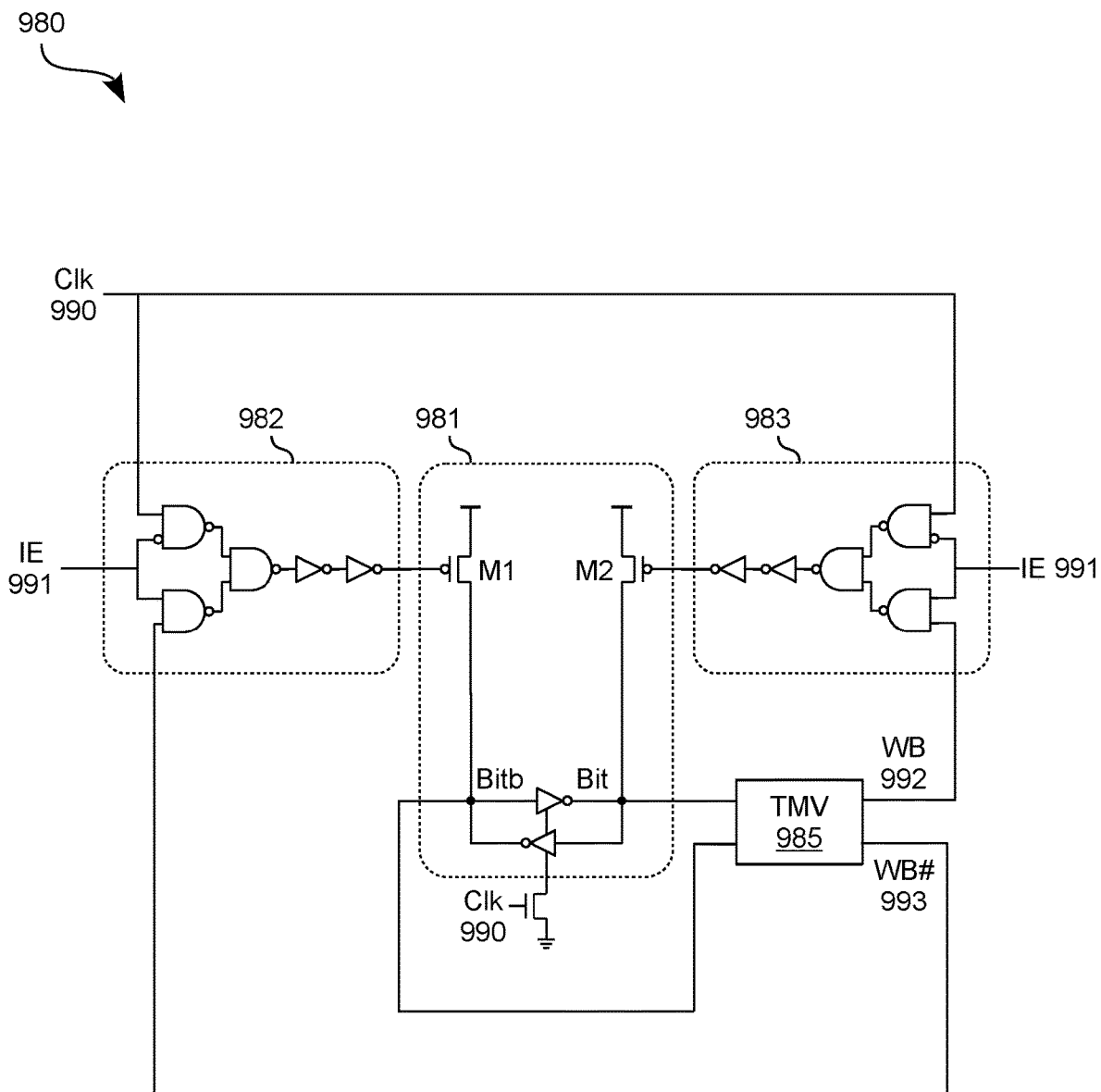
FIG. 9C shows a circuit diagram illustrating elements of an integrated circuit to provide a biasing according to an embodiment.

FIG. 9C shows circuitry 980 to perform cell stressing, according to another embodiment, based on a TMV evaluation which detects a preferred state of a cell circuit. As shown in FIG. 9C, circuitry 980 comprises a cell circuit 981 including transistors M1, M2 and inverters which are cross-coupled between two nodes Bit, Bitb. Combinatorial circuit 982 of circuitry 980 is coupled to control transistor M1 based on some or all of an input enable signal IE 991, a clock signal Clk 990, and a write back signal WB#993. Combinatorial circuit 983 of circuitry 980 is coupled to control transistor M2 based on some or all of IE 991, Clk 990, and another write back signal WB 992 (which is complementary to WB#993).

Write back signals WB 992, WB#993 are generated by a circuit TMV 985 which performs temporal majority voting, wherein respective signals at nodes Bit, Bitb are repeatedly sampled during a period of time when cell circuit 981 is cyclically reset and allowed to settle into either of two states. Such temporal majority voting determines a preferred state of cell circuit 981 and, for example, whether cell circuit 981 is of a PUF cell type or an RNG cell type. In some embodiments, generation of WB 992, WB#993 is further based on TMV 985 receiving another signal (not shown)—e.g., from selector logic 630—which indicates a direction toward which cell circuit 981 is to be biased.

Figure 10:
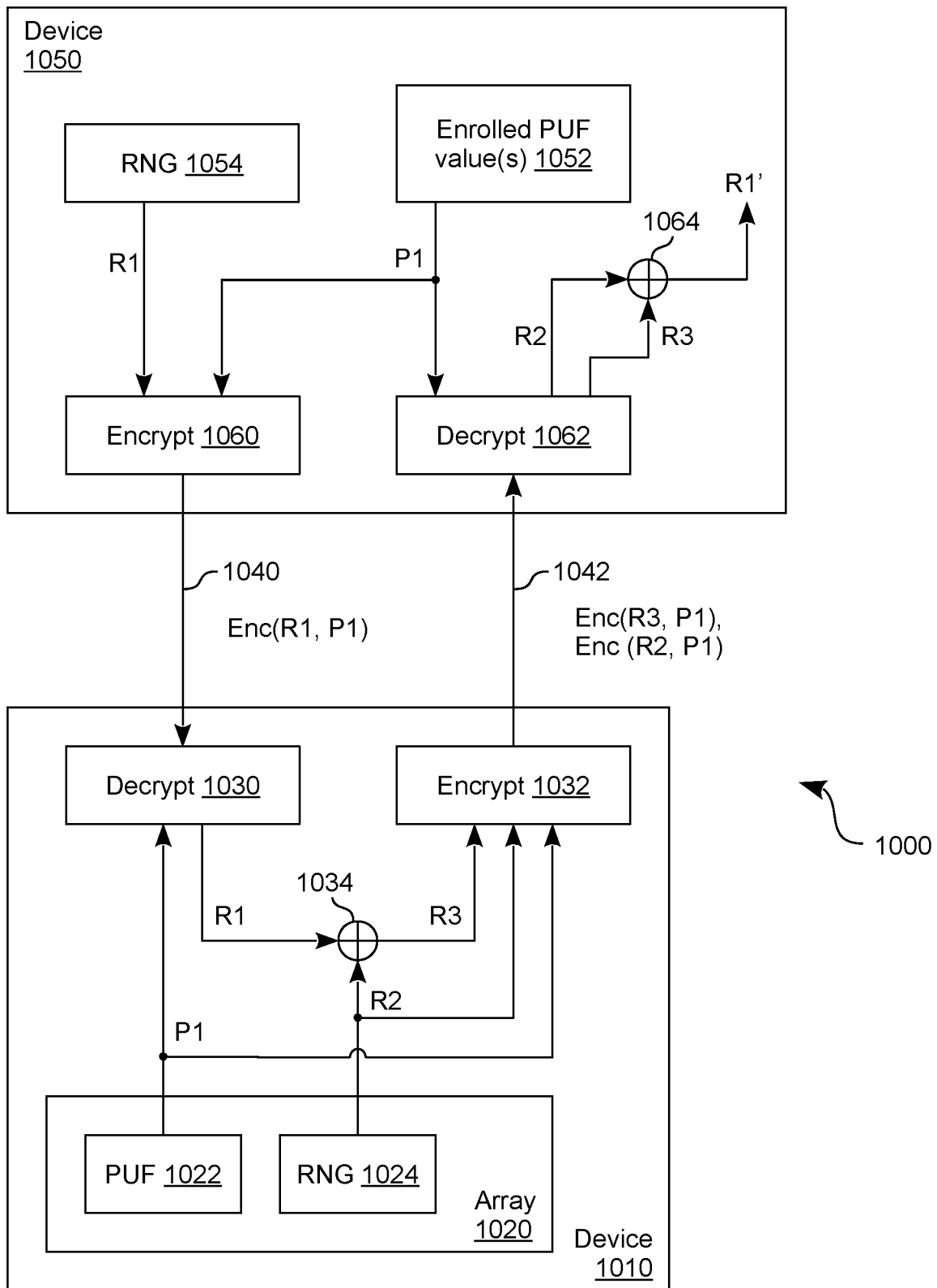
FIG. 10 shows a functional block diagram illustrating elements of a system to communicate a signal based on circuitry which is stressed according to an embodiment.

FIG. 10 shows features of a system 1000 to generate a communication with cell circuits which are variously stressed according to an embodiment. Such cell circuits include features of cells 612a, . . . , 612n (for example)—e.g., wherein stressing of the cells includes one or more operations of method 700. As shown in FIG. 10, system 1000 includes devices 1010, 1050 which support communications to facilitate an authentication of device 1010 to device 1050 (and, in some embodiments, one or more other devices).

For example, device 1050 comprises random number generator circuitry RNG 1054, decryption logic (Decrypt) 1062, and encryption logic (Encrypt) 1060. Furthermore, device 1010 comprises decryption logic (Decrypt) 1030, encryption logic (Encrypt) 1032, and an array 1020 of cell circuits. Array 1020 comprises, for example, both PUF cells 1022 which are to provide PUF functionality, and RNG cells 1024 which are to provide random number generation functionality.

The respective functionality of some or all of PUF cells 1022 and RNG cells 1024 is based, for example, on cell biasing using any of various cell stressing techniques which are described herein. In an embodiment, PUF cells 1022 are operable to generate a unique value P1 for identifying device 1010 (or at least some resource thereof).

At some earlier point in time—e.g., during manufacture, assembly, or sale of device 1010—the value P1 is registered with device 1050 (where P1 is one included in the one or more enrolled PUF values 1052 shown).

During operation of system 1000, an encrypted challenge message 1040 is generated, by encryption logic 1060, based on both a random value R1 (generated by RNG 1054) and the enrolled PUF value P1. Using the value P1 (which is provided by PUF cells 1022), decryption logic 1030 decrypts the challenge message 1040 to retrieve the value R1. In addition to another random value R2 generated by RNG cells 1024, the retrieved value R1 is then provided to circuitry 1034 of device 1010. Using the values R1 and R2, circuitry 1034 generates another value R3 which is provided—in addition to the values R2 and P1—to encryption logic 1032.

An encrypted communication 1042—provided to device 1050 in response to challenge message 1040—is generated by encryption logic 1032 based on the values R2, R3 and P1. In one example embodiment, communication 1042 comprises a first encrypted value which is based on R3 and P1, and a second encrypted value which is based on R2 and P1. Based on a description of the response message 1040, decryption logic 1062 retrieves both R2 and R3. Circuitry 1064 performs a calculation—e.g., an inverse of the calculation performed by circuitry 1034—to generate a value R1' based on the retrieved values R2 and R3. The authenticity of device 1010 is then confirmed, or invalidated, where it is determined that the value R1' is equal to the value R1.

Figure 11:
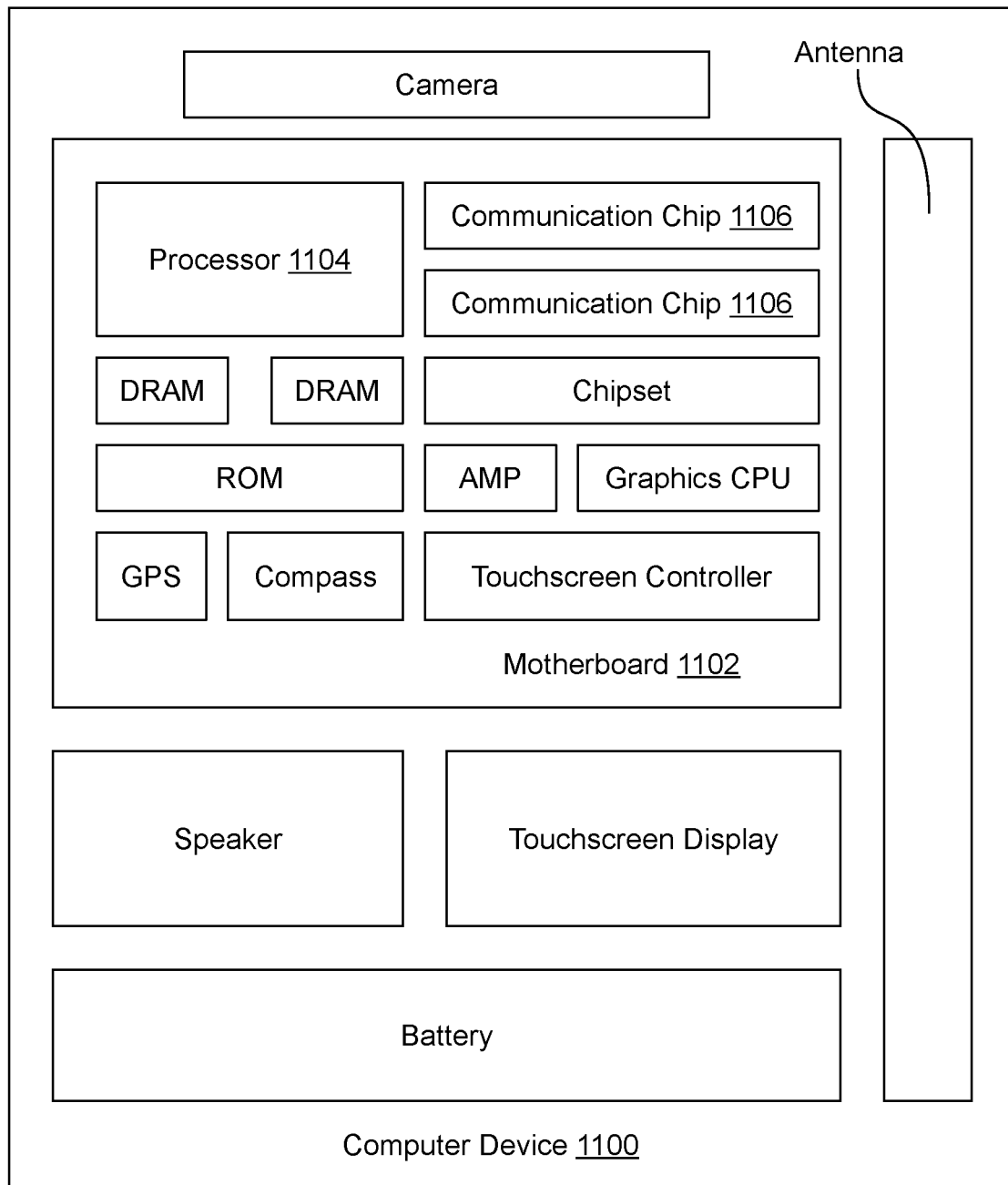
FIG. 11 shows a functional block diagram illustrating a computing device in accordance with one embodiment.

FIG. 11 illustrates a computing device 1100 in accordance with one embodiment. The computing device 1100 houses a board 1102. The board 1102 may include a number of components, including but not limited to a processor 1104 and at least one communication chip 1106. The processor 1104 is physically and electrically coupled to the board 1102. In some implementations the at least one communication chip 1106 is also physically and electrically coupled to the board 1102. In further implementations, the communication chip 1106 is part of the processor 1104.

Depending on its applications, computing device 1100 may include other components that may or may not be physically and electrically coupled to the board 1102. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 1106 enables wireless communications for the transfer of data to and from the computing device 1100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1106 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 1100 may include a plurality of communication chips 1106. For instance, a first communication chip 1106 may be dedicated to shorter range wireless communications such as Wi-Fi and Bluetooth and a second communication chip 1106 may be dedicated to longer range wireless communications such as GPS, EDGE, GPRS, CDMA, WiMAX, LTE, Ev-DO, and others.

The processor 1104 of the computing device 1100 includes an integrated circuit die packaged within the processor 1104. The term "processor" may refer to any device or portion of a device that processes electronic data from registers and/or memory to transform that electronic data into other electronic data that may be stored in registers and/or memory. The communication chip 1106 also includes an integrated circuit die packaged within the communication chip 1106.

In various implementations, the computing device 1100 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 1100 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 12:
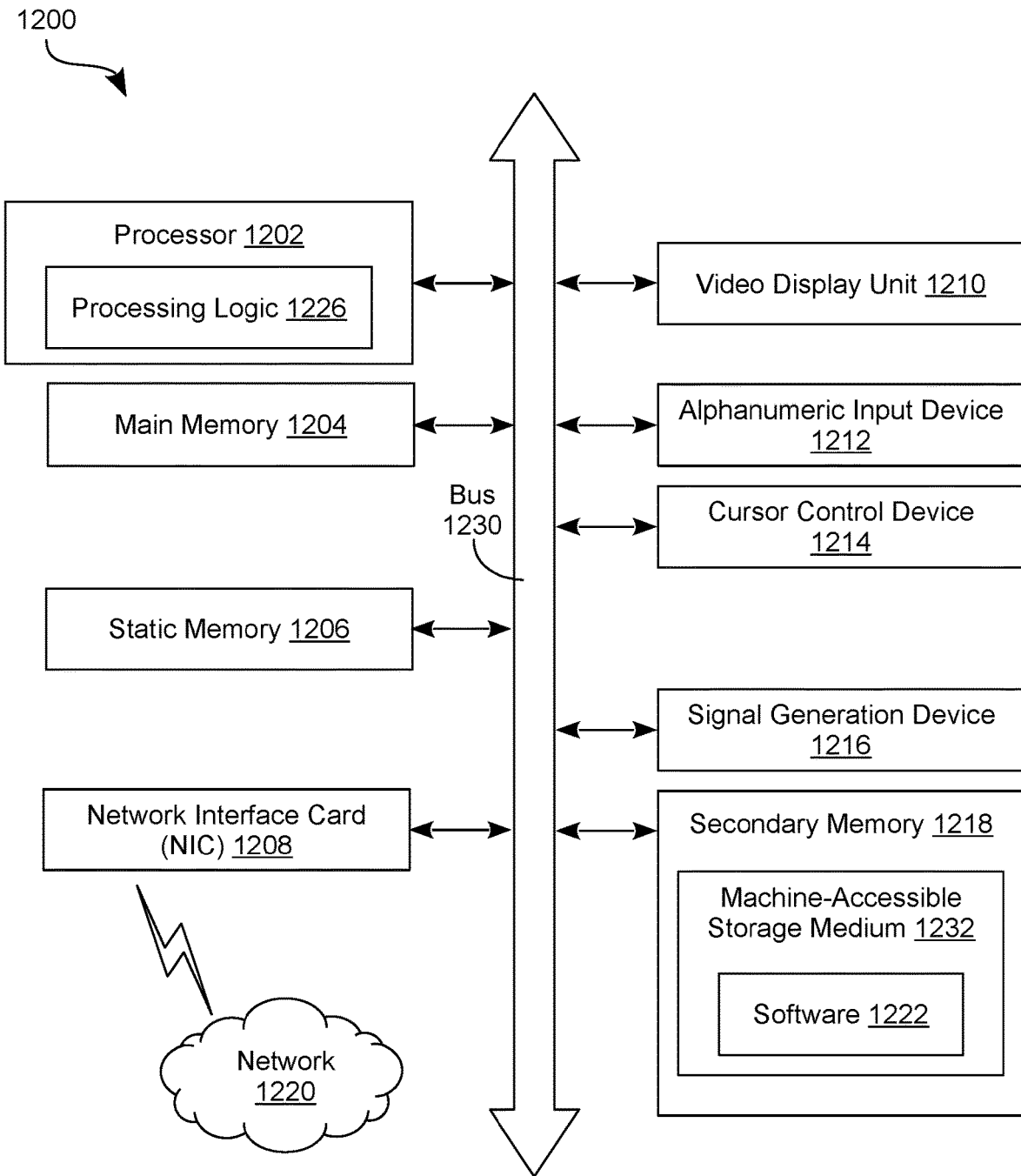
FIG. 12 shows a functional block diagram illustrating an exemplary computer system, in accordance with one embodiment.

FIG. 12 illustrates a diagrammatic representation of a machine in the exemplary form of a computer system 1200 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory 1218 (e.g., a data storage device), which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like. Processor 1202 is configured to execute the processing logic 1226 for performing the operations described herein.

The computer system 1200 may further include a network interface device 1208. The computer system 1200 also may include a video display unit 1210 (e.g., a liquid crystal display (LCD), a light emitting diode display (LED), or a cathode ray tube (CRT)), an alphanumeric input device 1212 (e.g., a keyboard), a cursor control device 1214 (e.g., a mouse), and a signal generation device 1216 (e.g., a speaker).

The secondary memory 1218 may include a machine-accessible storage medium (or more specifically a computer-readable storage medium) 1232 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1200, the main memory 1204 and the processor 1202 also constituting machine-readable storage media. The software 1222 may further be transmitted or received over a network 1220 via the network interface device 1208.

While the machine-accessible storage medium 1232 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for changing a stability of a circuit device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   first circuitry to receive a signal which indicates a preferred state of a cell circuit that comprises PMOS transistors M1, M2 each coupled between a first voltage rail and a different respective one of a first node or a second node, wherein, for each of the PMOS transistors M1, M2, a gate terminal of the transistor is coupled to a source terminal of the transistor, wherein, during the preferred state, the cell circuit provides first complementary signals each at a different respective one of the first node or the second node;
   second circuitry to determine, based on the signal, a correspondence of second complementary signals each to a different respective one of the first node or the second node; and
   third circuitry to apply a stress to the cell circuit, the third circuitry comprising:
      circuitry to reverse a relative polarity of a first voltage at a first voltage rail with respect to a second voltage at a second voltage rail; and
      circuitry to provide the second complementary signals, after the relative polarity is reversed, to the first node and the second node according to the correspondence.

2. The device of claim 1, wherein the cell circuit further comprises NMOS transistors each coupled between the second voltage rail and different respective one of the first node or the second node, wherein respective gate terminals of the NMOS transistors are each coupled to a different respective one of the first node or the second node.

3. The device of claim 1, wherein the cell circuit further comprises PMOS transistors each coupled between the second voltage rail and different respective one of the first node or the second node, wherein respective gate terminals of the PMOS transistors are each coupled to a different respective one of the first node or the second node.

4. The device of claim 1, wherein the third circuitry is to apply the stress to increase a physically unclonable function behavior of the cell circuit.

5. The device of claim 1, wherein the third circuitry is to apply the stress to increase a random number generator behavior of the cell circuit.

6. The device of claim 1, wherein the second circuitry to determine the correspondence comprises circuitry to perform a temporal majority voting evaluation of the cell circuit.

7. The device of claim 1, wherein before the stress is applied, the cell circuit exhibits one of a physically unclonable function behavior or a random number generator behavior, and wherein after the stress is applied, the cell circuit exhibits another of the physically unclonable function behavior or the random number generator behavior.

8. The device of claim 1, wherein the circuitry to reverse the relative polarity comprises:
   circuitry to transition the first voltage from being in a range of 1 Volt (V) to 2 V to being 0 V; and
   circuitry to transition the second voltage from being 0 V to being in a range of 1 V to 2 V.

9. The device of claim 1, further comprising circuitry to induce the preferred state of the cell circuit, comprising circuitry to enable, and then disable, a conductive path between the first node and the second node.

10. One or more Non-transitory computer-readable storage media having stored thereon instructions which, when executed by one or more processing units, cause the one or more processing units to perform a method comprising:
    receiving a signal indicating a preferred state of a cell circuit which comprises PMOS transistors M1, M2 each coupled between a first voltage rail and a different respective one of a first node or a second node, wherein, for each of the PMOS transistors M1, M2, a gate terminal of the transistor is coupled to a source terminal of the transistor, wherein, during the preferred state, the cell circuit provides first complementary signals each at a different respective one of the first node or the second node;
    based on the signal, determining a correspondence of second complementary signals each to a different respective one of the first node or the second node; and
    applying a stress to the cell circuit, the applying comprising:
       reversing a relative polarity of a first voltage at a first voltage rail with respect to a second voltage at a second voltage rail; and
       after reversing the relative polarity, providing the second complementary signals to the first node and the second node according to the correspondence.

11. The one or more computer-readable storage media of claim 10, wherein applying the stress increases a physically unclonable function behavior of the cell circuit.

12. The one or more computer-readable storage media of claim 10, wherein determining the correspondence comprises performing a temporal majority voting evaluation of the cell circuit.

13. The one or more computer-readable storage media of claim 10, wherein before the stress is applied, the cell circuit exhibits one of a physically unclonable function behavior or a random number generator behavior, and wherein after the stress is applied, the cell circuit exhibits another of the physically unclonable function behavior or the random number generator behavior.

14. The one or more computer-readable storage media of claim 10, the method further comprising:
    inducing the preferred state of the cell circuit, comprising:
    operating a transistor, coupled between the first node and the second node, to enable and then disable a conductive path between the first node and the second node.

15. A system comprising:
    an integrated circuit (IC) comprising:
       first circuitry to receive a signal which indicates a preferred state of a cell circuit that comprises PMOS transistors M1, M2 each coupled between a first voltage rail and a different respective one of a first node or a second node, wherein, for each of the PMOS transistors M1, M2, a gate terminal of the transistor is coupled to a source terminal of the transistor, wherein, during the preferred state, the cell circuit provides first complementary signals each at a different respective one of the first node or the second node;
       second circuitry to determine, based on the signal, a correspondence of second complementary signals each to a different respective one of the first node or the second node; and
       third circuitry to apply a stress to the cell circuit, the third circuitry comprising:
          circuitry to reverse a relative polarity of a first voltage at a first voltage rail with respect to a second voltage at a second voltage rail; and circuitry to provide the second complementary signals, after the relative polarity is reversed, to the first node and the second node according to the correspondence; and a display device coupled to the IC, the display device to display an image based on a signal communicated with the cell circuit.

16. The system of claim 15, wherein the cell circuit further comprises PMOS transistors each coupled between the second voltage rail and different respective one of the first node or the second node, wherein respective gate terminals of the PMOS transistors are each coupled to a different respective one of the first node or the second node.

17. The system of claim 15, wherein the third circuitry is to apply the stress to increase a random number generator behavior of the cell circuit.

18. The system of claim 15, wherein the second circuitry to determine the correspondence comprises circuitry to perform a temporal majority voting evaluation of the cell circuit.

19. The system of claim 15, wherein before the stress is applied, the cell circuit exhibits one of a physically unclonable function behavior or a random number generator behavior, and wherein after the stress is applied, the cell circuit exhibits another of the physically unclonable function behavior or the random number generator behavior.

20. The system of claim 15, further comprising circuitry to induce the preferred state of the cell circuit, comprising circuitry to enable, and then disable, a conductive path between the first node and the second node.

* * * * *